US012474999B2

(12) United States Patent
Rakesh et al.

(10) Patent No.: US 12,474,999 B2
(45) Date of Patent: Nov. 18, 2025

(54) OPTIMAL ENVIRONMENT SIZING FOR PERFORMING ASSET BACKUP OPERATIONS

(71) Applicant: Dell Products L.P., Round Rock, TX (US)

(72) Inventors: Aaditya Rakesh, Punjab (IN); Upanshu Singhal, Bangalore (IN); Ravi Vijayakumar Chitloor, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 250 days.

(21) Appl. No.: 18/486,702

(22) Filed: Oct. 13, 2023

(65) Prior Publication Data

US 2025/0123928 A1 Apr. 17, 2025

(51) Int. Cl.
*G06F 11/14* (2006.01)

(52) U.S. Cl.
CPC ...... *G06F 11/1461* (2013.01); *G06F 11/1451* (2013.01)

(58) Field of Classification Search
CPC .......................... G06F 11/1451; G06F 11/1461
USPC .......................................................... 711/162
See application file for complete search history.

(56) References Cited

U.S. PATENT DOCUMENTS

| 8,060,476 | B1 * | 11/2011 | Afonso | G06F 11/1464 |
| | | | | 707/823 |
| 9,678,836 | B1 * | 6/2017 | Westenberg | G06F 16/122 |
| 10,860,427 | B1 * | 12/2020 | Chakraborty | G06F 11/1464 |
| 11,556,427 | B1 * | 1/2023 | Brenner | G06F 11/1461 |
| 11,593,226 | B2 * | 2/2023 | Khan | G06F 11/1464 |
| 11,734,130 | B1 * | 8/2023 | Khanna | G06F 11/1469 |
| | | | | 714/4.11 |
| 11,899,625 | B2 * | 2/2024 | Khachane | G06F 12/0253 |

(Continued)

FOREIGN PATENT DOCUMENTS

| CN | 112612645 A | * | 4/2021 | .......... G06F 11/1448 |
| CN | 113722152 B | * | 8/2023 | .......... G06F 11/1451 |

OTHER PUBLICATIONS

Machine translation of CN 112612645 (Year: 2021).*
Machine translation of CN 113722152 (Year: 2023).*

*Primary Examiner* — Reginald G Bragdon
*Assistant Examiner* — Aaron D Ho
(74) *Attorney, Agent, or Firm* — Chamberlain, Hrdlicka, White, Williams & Aughtry; Aly Z. Dossa

(57) ABSTRACT

A method for sizing backup infrastructure. The method includes: receiving a sizing request including an asset protection policy covering an asset of the backup infrastructure, the asset protection policy at least specifying the asset; based on receiving the sizing request: creating an asset snapshot of the asset; mounting the asset snapshot to obtain a mounted asset snapshot through which asset snapshot data of the asset snapshot is accessible; partitioning the asset snapshot data into a plurality of asset snapshot data slices; computing, at least based on a cardinality of the plurality of asset snapshot data slices, a number of proxy nodes of the backup infrastructure required to collectively perform a prospective backup operation entailing the asset snapshot data; and providing, in reply to the sizing request, a sizing response at least specifying the number of proxy nodes required to collectively perform the prospective backup operation.

20 Claims, 14 Drawing Sheets

(56) References Cited

U.S. PATENT DOCUMENTS

| | | | |
|---|---|---|---|
| 12,271,268 B1* | 4/2025 | Singhal | G06F 11/1464 |
| 2011/0231172 A1* | 9/2011 | Gold | G06F 11/3433 |
| | | | 703/13 |
| 2016/0196082 A1* | 7/2016 | Bhardwaj | G06F 3/0614 |
| | | | 711/162 |
| 2019/0243547 A1* | 8/2019 | Duggal | G06F 3/0619 |
| 2021/0374012 A1* | 12/2021 | Calmon | G06N 20/00 |
| 2022/0121535 A1* | 4/2022 | Bhatnagar | G06F 11/1451 |
| 2022/0317881 A1* | 10/2022 | Gunda | G06F 3/0619 |
| 2022/0334925 A1* | 10/2022 | Rakesh | G06F 11/1451 |
| 2022/0398168 A1* | 12/2022 | Singhal | G06F 11/3433 |
| 2023/0025570 A1* | 1/2023 | Jagan Mohan | G06F 11/1461 |
| 2023/0205641 A1* | 6/2023 | Yadav | G06F 11/1451 |
| 2023/0305929 A1* | 9/2023 | Doshi | G06F 9/5022 |
| 2023/0362172 A1* | 11/2023 | Mandagere | G06F 21/6272 |
| 2024/0201887 A1* | 6/2024 | Chopra | G06F 3/067 |
| 2024/0202074 A1* | 6/2024 | Acharya | G06F 11/1451 |
| 2024/0202076 A1* | 6/2024 | He | G06F 11/1451 |
| 2024/0232022 A1* | 7/2024 | Kochar | G06F 11/1464 |
| 2024/0248649 A1* | 7/2024 | Singhal | G06F 3/067 |
| 2024/0248808 A1* | 7/2024 | Marri | G06F 11/1464 |
| 2024/0348502 A1* | 10/2024 | Prakash | H04L 41/0856 |
| 2025/0103437 A1* | 3/2025 | Singhal | G06F 11/1461 |
| 2025/0103439 A1* | 3/2025 | Singhal | G06F 11/1464 |

\* cited by examiner

OPTIMAL ENVIRONMENT SIZING FOR PERFORMING ASSET BACKUP OPERATIONS

BACKGROUND

During the deployment and configuration phase of a backup workload, a user is often not aware of the expected backup throughput, the number of compute nodes required for optimal throughput, and the approximate backup completion time for full backups and any subsequent incremental backups.

SUMMARY

In general, in one aspect, embodiments described herein relate to a method for sizing backup infrastructure. The method includes: receiving a sizing request including an asset protection policy covering an asset of the backup infrastructure, the asset protection policy at least specifying the asset; based on receiving the sizing request: creating an asset snapshot of the asset; mounting the asset snapshot to obtain a mounted asset snapshot through which asset snapshot data of the asset snapshot is accessible; partitioning the asset snapshot data into a plurality of asset snapshot data slices; computing, at least based on a cardinality of the plurality of asset snapshot data slices, a number of proxy nodes of the backup infrastructure required to collectively perform a prospective backup operation entailing the asset snapshot data; and providing, in reply to the sizing request, a sizing response at least specifying the number of proxy nodes required to collectively perform the prospective backup operation.

In general, in one aspect, embodiments described herein relate to a non-transitory computer readable medium (CRM). The non-transitory CRM includes computer readable program code, which when executed by a computer processor, enables the computer processor to perform a method for sizing backup infrastructure. The method includes: receiving a sizing request including an asset protection policy covering an asset of the backup infrastructure, the asset protection policy at least specifying the asset; based on receiving the sizing request: creating an asset snapshot of the asset; mounting the asset snapshot to obtain a mounted asset snapshot through which asset snapshot data of the asset snapshot is accessible; partitioning the asset snapshot data into a plurality of asset snapshot data slices; computing, at least based on a cardinality of the plurality of asset snapshot data slices, a number of proxy nodes of the backup infrastructure required to collectively perform a prospective backup operation entailing the asset snapshot data; and providing, in reply to the sizing request, a sizing response at least specifying the number of proxy nodes required to collectively perform the prospective backup operation.

In general, in one aspect, embodiments described herein relate to a backup infrastructure. The backup infrastructure includes: an asset; and a proxy node operatively connected to the asset and including a computer processor at least configured to perform a method for sizing the backup infrastructure. The method includes: receiving a sizing request including an asset protection policy covering the asset, the asset protection policy at least specifying the asset; based on receiving the sizing request: creating an asset snapshot of the asset; mounting the asset snapshot to obtain a mounted asset snapshot through which asset snapshot data of the asset snapshot is accessible; partitioning the asset snapshot data into a plurality of asset snapshot data slices; computing, at least based on a cardinality of the plurality of asset snapshot data slices, a number of proxy nodes required to collectively perform a prospective backup operation entailing the asset snapshot data; and providing, in reply to the sizing request, a sizing response at least specifying the number of proxy nodes required to collectively perform the prospective backup operation.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
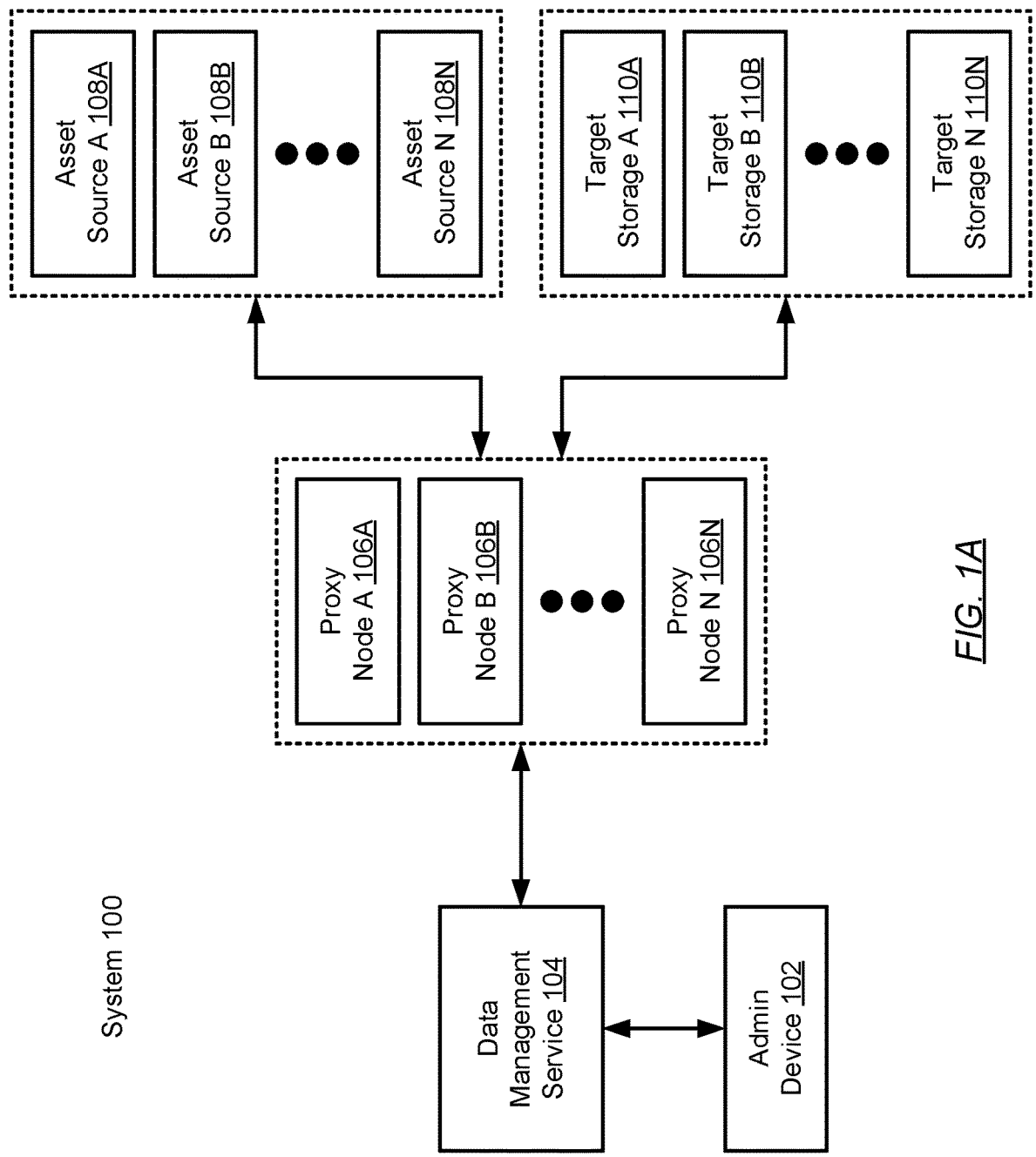
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to optimal environment sizing for performing asset backup operations. Particularly, during the deployment and configuration phase of a backup workload, a user is often unaware of the expected backup throughput, the number of compute nodes required for optimal throughput, the approximate backup completion time for full backups and any subsequent incremental backups, etc. Further, while configuring a protection policy, a user often requires (however may not be able to accurately obtain) information concerning the optimal number of compute nodes, the optimal number of parallel threads, as well as the awareness of infrastructure bottlenecks, which altogether drive the seamless execution of a data protection solution.

Embodiments described herein, therefore, address the aforementioned concern(s) by way of an automated environment sizing service configured to estimate and subsequently tune any underlying infrastructure directed to optimally conduct backup operations.

FIG. 1A shows a system in accordance with one or more embodiments described herein. The system (100) may reference asset protection infrastructure (also referred to herein as backup infrastructure), or more specifically, any enterprise information technology (IT) environment at least configured to facilitate the protection (e.g., via backup and/or recovery operations) of any granularity of data and/or metadata (descriptive of said data) pertinent to, for example, enterprise operations and services. To that end, the system (100) may include an admin device (102), a data management service (104), any number of proxy nodes (106A-106N), any number of asset sources (108A-108N), and any number of target storages (110A-110N). Each of these system (100) components is described below.

In one or many embodiment(s) described herein, the admin device (102) may represent any physical appliance or any computing device operated by one or many administrator(s) of the system (100). An administrator, in turn, may refer to an individual or entity whom may be responsible for overseeing system (100) operations and maintenance. Examples of the admin device (102) may include, but are not limited to, a desktop computer, a laptop computer, a network server, a smartphone, a tablet computer, or any other computing system similar to the exemplary computing system illustrated and described with respect to FIG. 4, below.

In one or many embodiment(s) described herein, and at least in part, the admin device (102) may include functionality to: control the data management service (104) in order to configure and execute any number of asset protection policies (see e.g., FIG. 1B) for any number of assets (see e.g., FIG. 1D); submit pre-backup requests to the data management service (104), where said requests may pertain to assessing a viability of at least a portion of the system (100)—e.g., the proxy node(s) (106A-106N), the asset source(s) (108A-108N), the target storage(s) (110A-110N), and the network fabric(s) there-between (not shown)—to fulfill any asset backup and/or recovery operation(s) in accordance with any asset protection policy configured by any administrator(s); receive pre-backup responses from the data management service (104) and in reply to any corresponding pre-backup requests submitted thereto, where said responses may include backup infrastructure assessments capturing the current viability, as well as providing any alert(s) and/or recommendation(s) pertinent to the optimal environment sizing, of the backup infrastructure to conduct any asset protection operations defined by any configured asset protection policies; provide any tool(s) through which any administrator(s) may, at least in part, address any issue(s) and/or implement any suggestion(s) concerning the backup infrastructure based on any received pre-backup responses; and submit backup requests to the data management service (104), where said requests may pertain to executing any asset backup and/or recovery operation(s) using the original or a tuned backup infrastructure and per any configured asset protection policy/policies. One of ordinary skill, however, will appreciate that the admin device (102) may perform other functionalities without departing from the scope of the embodiments described herein.

In one or many embodiment(s) described herein, the data management service (104) may represent any enterprise IT infrastructure at least configured to orchestrate, and thus centralize, asset discovery, protection, and governance. The data management service (104) may be implemented through on-premises infrastructure, cloud computing infrastructure, or any hybrid infrastructure thereof. As such, the data management service (104) may be implemented using one or more network servers (not shown), where each network server may represent a physical network server or a virtual network server. Additionally, or alternatively, the data management service (104) may be implemented using one or more computing systems similar to the exemplary computing system illustrated and described with respect to FIG. 4, below.

In one or many embodiment(s) described herein, and at least in part, the data management service (104) may include functionality to: process any pre-backup requests and/or backup requests (described above) submitted by the admin device (102)—the method for doing so being illustrated and described below with respect to FIGS. 3A and 3B. One of ordinary skill, however, will appreciate that the data management service (104) may perform other functionalities without departing from the scope of the embodiments described herein. Moreover, the data management service (104) is illustrated and described in further detail below with respect to FIG. 1B.

In one or many embodiment(s) described herein, any proxy node (106A-106N) may represent any physical (or virtual) appliance, or any computing device, at least configured to implement at least a portion of any asset discovery, protection, and/or governance activities orchestrated by the data management service (104). Any proxy node (106A-106N), furthermore, may be implemented through on-premises infrastructure, cloud computing infrastructure, or any hybrid infrastructure thereof. As such, any proxy node (106A-106N) may be implemented using one or more network servers (not shown), where each network server may represent a physical network server or a virtual network server. Additionally, or alternatively, any proxy node (106A-106N) may be implemented using one or more computing systems similar to the exemplary computing system illustrated and described with respect to FIG. 4, below.

In one or many embodiment(s) described herein, and at least in part, any proxy node (106A-106N) may include functionality to: process sizing requests and/or backup instructions submitted by the data management service (104)—the method for collectively doing so being illustrated and described below with respect to FIGS. 2A-2F. Any sizing request may pertain to the execution of a backup infrastructure assessment capturing the current viability, as well as providing any alert(s) and/or recommendation(s) pertinent to the optimal environment sizing, of the backup infrastructure to conduct any asset protection operations defined by any configured asset protection policies. Any optimal environment sizing, in turn, may refer to an ideal backup infrastructure configuration (e.g., number of proxy nodes, number of read and/or write streams per proxy node, etc.) sufficing backup and/or recovery requirements specified in any particular asset protection policy. Any backup instruction, meanwhile, may pertain to the execution of a full or incremental backup operation entailing at least one asset per any particular asset protection policy covering said at least one asset. One of ordinary skill, however, will appreciate that any proxy node (106A-106N) may perform other functionalities without departing from the scope of the embodiments described herein. Moreover, any proxy node (106A-106N) is illustrated and described in further detail below with respect to FIG. 1C.

In one or many embodiment(s) described herein, any asset source (108A-108N) may represent any physical appliance or any computing device at least configured to receive, generate, process, store, and/or transmit data (and metadata descriptive thereof), as well as to provide an environment in which any number of computer programs and/or assets (see e.g., FIG. 1D) may execute or be maintained thereon. Examples of any asset source (108A-108N) may include, but are not limited to, a desktop computer, a laptop computer, a network server, a smartphone, a tablet computer, or any other computing system similar to the exemplary computing system illustrated and described with respect to FIG. 4, below.

In one or many embodiment(s) described herein, the above-mentioned computer program(s) may, for example, implement large-scale and complex data processing; or implement one or more services offered locally or over a network, whereas the asset(s) may retain vast quantities of data and state pertinent to enterprise operations and/or services. Furthermore, in providing an execution environment for any computer program(s) installed thereon, any asset source (108A-108N) may include functionality to: allocate various native resources (e.g., computer processors, memory, storage, virtualization, network bandwidth, etc.), as needed, to the computer program(s) and/or the tasks (or processes) instantiated thereby. One of ordinary skill, however, will appreciate that any asset source (108A-108N) may perform other functionalities without departing from the scope of the embodiments described herein. Any asset source (108A-108N), moreover, is illustrated and described in further detail below with respect to FIG. 1D.

In one or many embodiment(s) described herein, any target storage (110A-110N) may represent any information backup, archiving, and/or disaster recovery storage system. Any target storage (110A-110N) may be implemented using one or more storage servers (not shown), where each storage server may represent a physical, storage-dedicated network server or a virtual, storage-dedicated network server. Additionally, or alternatively, any target storage (110A-110N) may be implemented using one or more computing systems similar to the exemplary computing system illustrated and described with respect to FIG. 4, below.

In one or many embodiment(s) described herein, the storage server(s) of any target storage (110A-110N) may include, and may be supported by, a collection of one or more physical storage devices (not shown) on various forms of digital information—e.g., any number of asset data and/or metadata copies (see e.g., FIG. 1E)—may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, any target storage (110A-110N) is illustrated and described in further detail below with respect to FIG. 1E.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
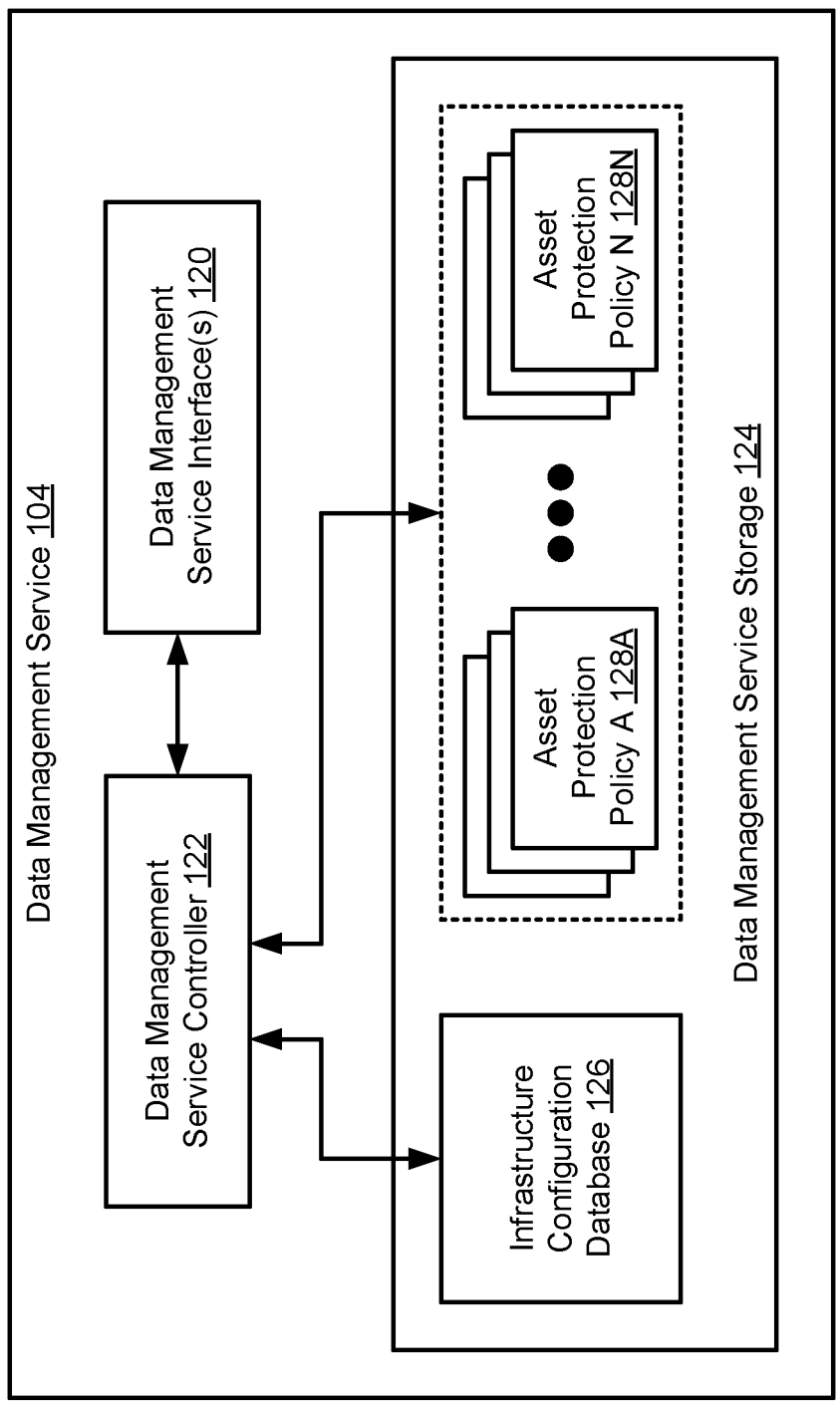
FIG. 1B shows a data management service in accordance with one or more embodiments described herein.

FIG. 1B shows a data management service in accordance with one or more embodiments described herein. The data management service (104) may include any number of data management service interfaces (120), a data management service controller (122), and data management service storage (124). Each of these data management service (104) subcomponents is described below.

In one or many embodiment(s) described herein, any data management service interface (120) may refer to networking hardware (e.g., a network card or adapter), a computer program implementing a logical interface (e.g., an application programming interface (API)) and executing on the underlying hardware of the data management service (104), an interactivity protocol, or any combination thereof, at least configured to enable or facilitate communications (or information exchange) between the data management service (104) and other entities (e.g., any number of proxy nodes (see e.g., FIGS. 1A and 1C) and the admin device (see e.g., FIGS. 1A)).

In one or many embodiment(s) described herein, and at least in part, any data management service interface (120) may include functionality to: receive any number of pre-backup requests from the admin device, each specifying an asset protection policy for an asset (see e.g., FIG. 1D); provide said received pre-backup request(s) to the data management service controller (122) for processing; in response to the pre-backup request(s) provided thereto, obtain any number of sizing requests from the data management service controller (122), each specifying the asset protection policy for the asset specified in a corresponding pre-backup request; transmit the obtained sizing request(s) each to any number of proxy nodes for processing; in reply to the sizing request(s) transmitted thereto, receive any number of sizing responses each from the proxy node(s), each specifying a backup infrastructure assessment capturing the current viability, as well as providing any alert(s) and/or recommendation(s) pertinent to the optimal environment sizing, of the backup infrastructure to conduct any asset protection (i.e., backup and/or recovery) operations configured via the specified asset protection policy/policies; provide said received sizing response(s) to the data management service controller (122) for processing; in reply to the sizing response(s) provided thereto, obtain any number of pre-backup responses from the data management service controller (122), each specifying the backup infrastructure assessment specified in a corresponding sizing response; and transmit the obtained pre-backup response(s) to the admin device for review by any administrator(s) operating the admin device.

In one or many embodiment(s) described herein, and at least in part, any data management service interface (120) may include further functionality to: in reply to the pre-backup response(s) transmitted thereto, receive any number of backup requests from the admin device, each specifying the specified asset protection policy (or a revised asset protection policy) covering an asset; provide the received backup request(s) to the data management service controller (122) for processing; in reply to the backup request(s) provided thereto, obtain any number of backup instructions from the data management service controller (122), each specifying at least a portion of the asset protection policy (or the revised asset protection policy) covering the asset in a corresponding backup request; transmit the obtained backup instruction(s) each to any number of proxy nodes for processing; in reply to the backup instruction(s) transmitted thereto, receive any number of instruction responses each from the proxy node(s), each specifying the completion (or incompletion) of an asset protection operation; provide the received instruction response(s) to the data management service controller (122) for processing; in reply to the instruction response(s) provided thereto, obtain any number of backup responses from the data management service controller (122), each specifying said completion (or incompletion) of the asset protection operation instructed to be conducted in a corresponding backup request; and transmit the obtained backup response(s) to the admin device for review by any administrator(s) operating the admin device. One of ordinary skill, however, will appreciate that any data management service interface (120) may perform other functionalities without departing from the scope of the embodiments described herein.

In one or many embodiment(s) described herein, the data management service controller (122) may refer to instruction-processing hardware (e.g., any number of integrated circuits for processing computer readable instructions), a computer program executing on the underlying hardware of the data management service (104), or any combination thereof, at least configured to oversee and/or manage data management service (120) operations.

In one or many embodiment(s) described herein, and at least in part, the data management service controller (122) may include functionality to: obtain any number of pre-backup requests from the admin device via the data management service interface(s) (120), where each request specifies an asset protection policy for an asset (see e.g., FIG. 1D); generate any number of sizing requests, where each request specifies the asset protection policy for the asset specified in a corresponding pre-backup request; provide the generated sizing request(s) to the data management service interface(s) (120), where each request is to be transmitted towards any number of proxy nodes for processing; in reply to the transmitted sizing request(s), obtain any number of sizing responses from the proxy node(s) via the data management service interface(s) (120), where each response specifies a backup infrastructure assessment capturing the current viability, as well as providing any alert(s) and/or recommendation(s) pertinent to the optimal environment sizing, of the backup infrastructure to conduct any asset protection (i.e., backup and/or recovery) operations configured via the asset protection policy specified in a corresponding sizing request; generate any number of pre-backup responses, where each response specifies the backup infrastructure assessment specified in a corresponding sizing response; and provide the generated pre-backup response(s) to the data management service interface(s) (120), where each response is to be transmitted towards the admin device for review by any administrator(s) operating the admin device.

In one or many embodiment(s) described herein, and at least in part, the data management service controller (122) may include further functionality to: in reply to the transmitted pre-backup response(s), obtain any number of backup requests from the admin device via the data management service interface(s) (120), where each request specifies the asset protection policy (or a revised asset protection policy) covering an asset (see e.g., FIG. 1D); generate any number of backup instructions, where each instruction specifies at least a portion of the asset protection policy (or at least a portion of the revised asset protection policy) covering the asset specified in a corresponding backup request; provide the generated backup instruction(s) to the data management service interface(s) (120), where each instruction is to be transmitted towards any number of proxy nodes for processing; in reply to the transmitted backup instruction(s), obtain any number of instruction responses from the proxy node(s) via the data management service interface(s) (120), where each response specifies the completion (or incompletion) of an asset protection operation; generate any number of backup responses, where each response specifies the completion (or incompletion) of the asset protection operation specified in a corresponding instruction response; and provide the generated backup response(s) to the data management service interface(s) (120), where each response is to be transmitted towards the admin device for review by any administrator(s) operating the admin device. One of ordinary skill, however, will appreciate that the data management service controller (122) may perform other functionalities without departing from the scope of the embodiments described herein.

In one or many embodiment(s) described herein, the data management service storage (124) may refer to a collection of one or more physical storage devices (not shown) on which various forms of digital information—e.g., an infrastructure configuration database (126) (described below) and any number of asset protection policies (128A-128N) (described below)—may be maintained. Each physical storage device may encompass non-transitory computer readable storage media on which said digital information may be stored in whole or in part, and temporarily or permanently. Further, the data management service storage (124) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, the infrastructure configuration database (126) may refer to a dedicated data repository configured to maintain any number of infrastructure configuration database entries (not shown). Each infrastructure configuration database entry, in turn, may store current configuration state respective to an asset source (see e.g., FIGS. 1A and 1D), an asset (see e.g., FIG. 1D), or a target storage (see e.g., FIGS. 1A and 1E). Should an infrastructure configuration database entry pertain to an asset source, the infrastructure configuration database entry may store asset source configuration state (e.g., a preferred asset source interface, any performance metric(s) related to the preferred asset source interface, any source infrastructure configuration flag(s), etc.) respective to the asset source. Meanwhile, should an infrastructure configuration database entry pertain to an asset, the infrastructure configuration database entry may at least store asset backup configuration state (e.g., number of proxy nodes, as well as number of read and/or write streams per proxy node, required for optimal full or incremental backup of the asset, etc.), with the option of additionally storing asset restore configuration state, respective to the asset. On the other hand, should an infrastructure configuration database entry pertain to a target storage, the infrastructure configuration database entry may store target storage configuration state (e.g., a preferred target storage interface, any performance metric(s) related to the preferred target storage interface, any target infrastructure configuration flag(s), etc.) respective to the target storage.

Figure 1C:
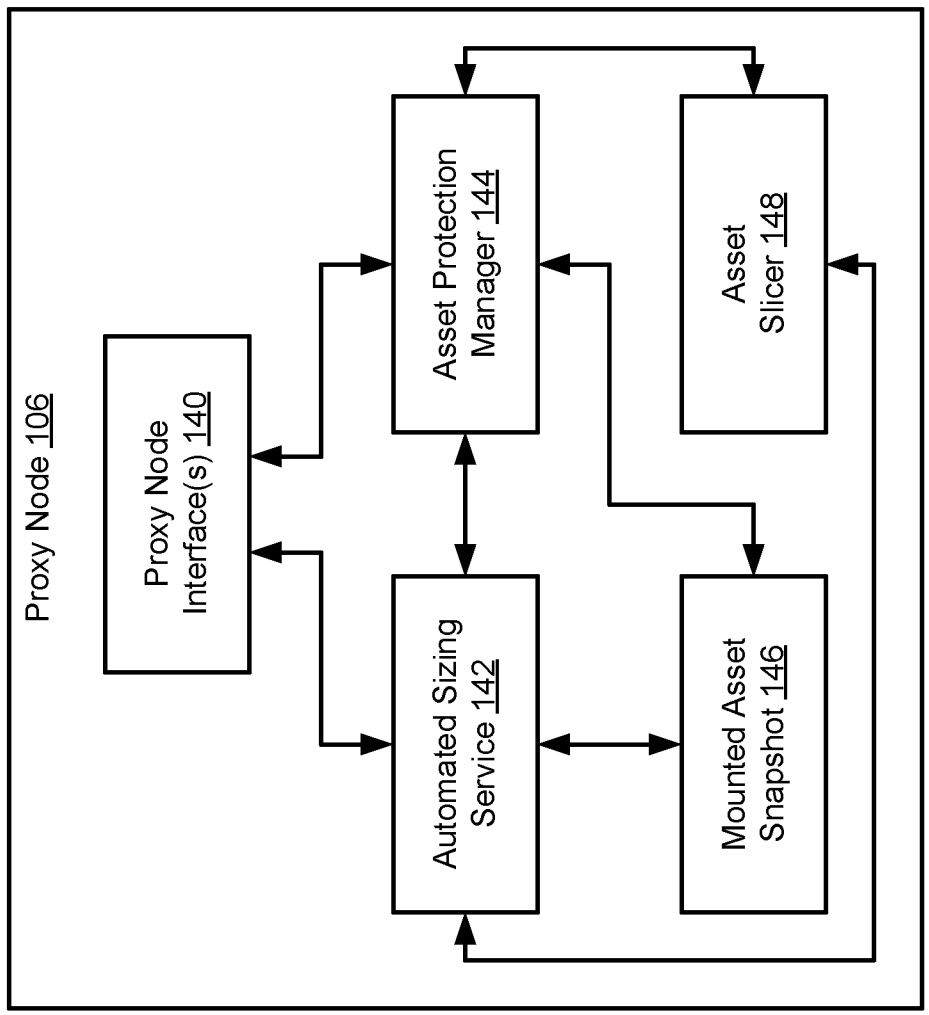
FIG. 1C shows a proxy node in accordance with one or more embodiments described herein.
Figure 1D:
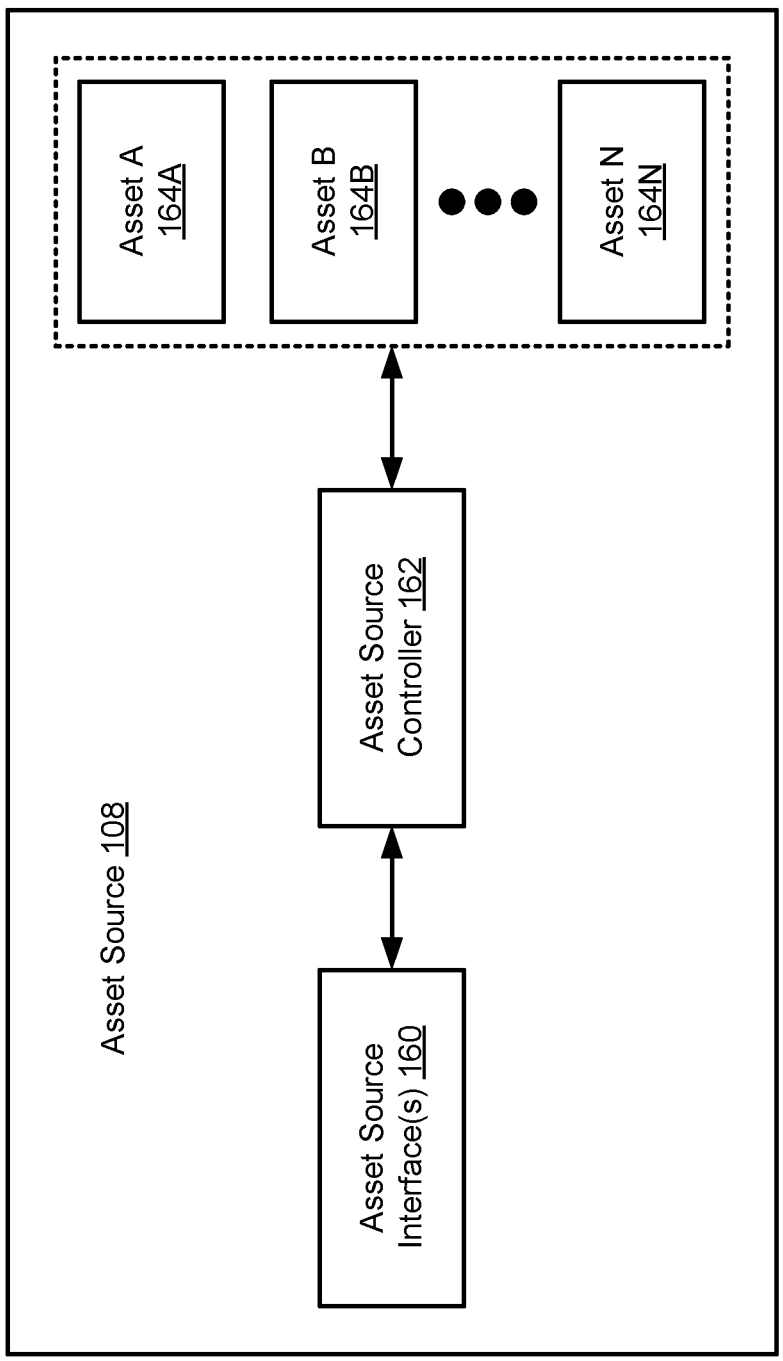
FIG. 1D shows an asset source in accordance with one or more embodiments described herein.

In one or many embodiment(s) described herein, any asset protection policy (128A-128N) may refer to a set of rules and procedures outlining a strategy for protecting (e.g., via any number of backup operations) data and/or metadata maintained on any given asset (see e.g., FIG. 1D). The set of rules and procedures may, for example, dictate: which asset data and/or metadata maintained on the given asset should be protected; on which asset source (see e.g., FIGS. 1A and 1D) is the given asset hosted or through which asset source is the given asset accessible; where (e.g., one or more target storages) should backup copies (e.g., asset data and/or metadata copies (see e.g., FIG. 1E)) of any protected asset data and/or metadata be stored; how often should a backup operation centered about the given asset transpire; and how long should any backup copies of any protected asset data and/or metadata be retained. Said set of rules and procedures are not limited to the aforementioned specific examples.

In one or many embodiment(s) described herein, any asset protection policy (128A-128N) may additionally refer to a list of user-defined requirements and/or properties pertinent to the protection (e.g., via any number of backup operations) of data and/or metadata maintained on any given asset (see e.g., FIG. 1D). The user-defined requirements and/or properties may, for example, include: an average data change rate for the given asset observed through a specified time period (e.g., one day, one week, etc.); user credentials, belonging to any administrator(s), providing access and protection authority directed to the given asset; a user-desired full backup time window reflecting a maximum time period in which a full backup of the given asset should complete; a user-desired incremental backup time window reflecting a maximum time period in which an incremental backup of the given asset should complete; a maximum number of available read streams that may be allocated towards the reading (or retrieving) of asset data and/or metadata of the given asset from a specified asset source (during any backup operations) or from a specified target storage (during any recovery operations); and a maximum number of available write streams that may be allocated towards the writing (or storing) of asset data and/or metadata of the given asset to a specified target storage (during any backup operations) or to a specified asset source (during any recovery operations). Said list of user-defined requirements and/or properties are not limited to the aforementioned specific examples.

While FIG. 1B shows a configuration of components and/or subcomponents, other data management service (104) configurations may be used without departing from the scope of the embodiments described herein.

FIG. 1C shows a proxy node in accordance with one or more embodiments described herein. The proxy node (106) may include any number of proxy node interface(s) (140), an automated sizing service (142), an asset protection manager (144), one or many mounted asset snapshot(s) (146), and an asset slicer (148). Each of these proxy node (106) subcomponents is described below.

In one or many embodiment(s) described herein, any proxy node interface (140) may refer to networking hardware (e.g., a network card or adapter), a computer program implementing a logical interface (e.g., an application programming interface (API)) and executing on the underlying hardware of the proxy node (106), an interactivity protocol, or any combination thereof, at least configured to enable or facilitate communications (or information exchange) between the proxy node (106) and other entities (e.g., the data management service (see e.g., FIGS. 1A and 1B), any number of asset sources (see e.g., FIGS. 1A and 1D), and any number of target storages (see e.g., FIGS. 1A and 1E)).

In one or many embodiment(s) described herein, and at least in part, any proxy node interface (140) may include functionality to: receive any number of sizing requests from the data management service, where each request specifies at least a portion of an asset protection policy (see e.g., FIG. 1B) covering an asset (see e.g., FIG. 1D); provide the received sizing request(s) to the asset protection manager (144) and/or the automated sizing service (142) for processing; during processing of the provided sizing request(s)—assist in any number of processing tasks (e.g., discovery of any number of asset source interfaces of any asset source(s), collection of any number of asset source interface performance metrics related to any discovered asset source interface(s), discovery of any number of target storage interfaces of any target storage(s), collection of any number of target storage interface performance metrics related to any discovered target storage interface(s), delivery of any number of asset snapshot creation requests to any asset source(s), receipt of any number of asset snapshots of any asset(s) from the asset source(s) in reply to the delivered asset snapshot creation request(s), etc.); in reply to the provided sizing request(s), obtain any number of sizing responses from the asset protection manager (144) and/or the automated sizing service (142), where each response specifies a backup infrastructure assessment capturing the current viability, as well as providing any alert(s) and/or recommendation(s) pertinent to the optimal environment sizing, of the backup infrastructure to conduct any asset protection (i.e., backup and/or recovery) operations configured via the asset protection policy covering the asset specified in a corresponding sizing request; and in reply to the received sizing request(s), transmit the obtained sizing response(s) to the data management service for handling.

In one or many embodiment(s) described herein, and at least in part, any proxy node interface (140) may include further functionality to: receive any number of backup instructions from the data management service, where each instruction specifies at least a portion of an asset protection policy (see e.g., FIG. 1B) (or at least a portion of a revised asset protection policy) covering an asset (see e.g., FIG. 1D); provide the received backup instruction(s) to the asset protection manager (144) for processing; in reply to the provided backup instruction(s), obtain any number of instruction responses from the asset protection manager (144), where each response specifies the completion (or incompletion) of an asset protection (e.g., full or incremental backup) operation specified in a corresponding backup instruction; and in reply to the received backup instruction(s), transmit the obtained instruction response(s) to the data management service for handling. One of ordinary skill, however, will appreciate that any proxy node interface (140) may perform other functionalities without departing from the scope of the embodiments described herein.

In one or many embodiment(s) described herein, the automated sizing service (142) may refer to instruction-processing hardware (e.g., any number of integrated circuits for processing computer readable instructions), a computer program executing on the underlying hardware of the proxy node (106), or any combination thereof, at least configured to perform any number of backup infrastructure assessments. Any backup infrastructure assessment may be directed to capturing a current viability, as well as providing any alert(s) and/or recommendation(s) pertinent to an optimal environment sizing, of the backup infrastructure to conduct any asset protection (i.e., backup and/or recovery) operations entailing an asset and according to an asset protection policy associated therewith.

In one or many embodiment(s) described herein, and at least in part, the automated sizing service (142) may include functionality to: obtain any number of sizing requests from the data management service via the proxy node interface(s) (140), where each request specifies at least a portion of an asset protection policy (see e.g., FIG. 1B) covering an asset (see e.g., FIG. 1D); process the received sizing request(s), in accordance with the method illustrated and described below with respect to FIGS. 2A-2F, to generate any number of sizing responses, where each response specifies a backup infrastructure assessment capturing the current viability, as well as providing any alert(s) and/or recommendation(s) pertinent to the optimal environment sizing, of the backup infrastructure to conduct any asset protection (i.e., backup and/or recovery) operations configured via the asset protection policy covering the asset specified in a corresponding sizing request; and provide the generated sizing response(s) to the proxy node interface(s) (140), where each response is to be transmitted towards the data management service in reply to a corresponding received sizing request. One of ordinary skill, however, will appreciate that the automated sizing service (142) may perform other functionalities without departing from the scope of the embodiments described herein.

In one or many embodiment(s) described herein, the asset protection manager (144) may refer to instruction-processing hardware (e.g., any number of integrated circuits for processing computer readable instructions), a computer program executing on the underlying hardware of the proxy node (106), or any combination thereof, at least configured to oversee and/or manage asset protection (i.e., backup and/or recovery) operations entailing any granularity of asset data and/or metadata of any number of assets across any number of asset sources (see e.g., FIGS. 1A and 1D).

In one or many embodiment(s) described herein, and at least in part, the asset protection manager (144) may include functionality to: receive any number of backup instructions from the data management service via the proxy node interface(s) (140), where each instruction specifies at least a portion of an asset protection policy (see e.g., FIG. 1B) (or at least a portion of a revised asset protection policy) covering an asset (see e.g., FIG. 1D); process the received backup instruction(s) to attempt any number of backup operations each entailing at least a portion of asset snapshot data (defined by/within an asset snapshot data slice) belonging to an asset snapshot of the asset covered by the at least portion of the asset protection policy (or the at least portion of the revised asset protection policy) specified in a corresponding backup instruction; generate any number of instruction responses, where each response specifies the completion (or incompletion) of an asset protection (e.g., full or incremental backup) operation specified in a corresponding backup instruction; and provide the instruction response(s) to the proxy node interface(s) (140), where each response is to be transmitted towards the data management service in reply to a corresponding received backup instruction. One of ordinary skill, however, will appreciate that the asset protection manager (144) may perform other functionalities without departing from the scope of the embodiments described herein.

In one or many embodiment(s) described herein, any mounted asset snapshot (146) may refer to an asset snapshot of an asset (see e.g., FIG. 1D), where any asset snapshot data, representing the asset snapshot, may be made available or accessible as a file-system implementation with which one or more proxy node (106) subcomponents (e.g., automated sizing service (142), asset protection manager (144), etc.) may interact to perform their respective responsibilities. The asset snapshot, in turn, may refer to a copy of the asset data and/or metadata, representative of or reflected in the asset, at a current point-in-time.

In one or many embodiment(s) described herein, the asset slicer (148) may refer to instruction-processing hardware (e.g., any number of integrated circuits for processing computer readable instructions), a computer program executing on the underlying hardware of the proxy node (106), or any combination thereof, at least configured to partition or slice the asset snapshot data of (and made accessible by) any mounted asset snapshot(s) (146) (e.g., via invocation by the automated sizing service (142) and/or the asset protection manager (144)).

In one or many embodiment(s) described herein, and at least in part, the asset slicer (148) may include functionality to: access and assess asset snapshot data pertaining to any mounted asset snapshot(s) (146); and partition said asset snapshot data into multiple asset snapshot data slices. The multiple asset snapshot data slices may be created, respectively, using multiple concurrent or parallel threads. Further, each asset snapshot data slice may be created such that an asset snapshot data slice size thereof does not exceed a predefined asset snapshot data slice size expressed either in bytes (e.g., 20 giga-bytes) or in a number of file system objects (e.g., 1,000 directories and/or files). One of ordinary skill, however, will appreciate that the asset slicer (148) may perform other functionalities without departing from the scope of the embodiments described herein.

While FIG. 1C shows a configuration of components and/or subcomponents, other proxy node (106) configurations may be used without departing from the scope of the embodiments described herein.

FIG. 1D shows an asset source in accordance with one or more embodiments described herein. The asset source (108) may include any number of asset source interfaces (160), an asset source controller (162), and any number of assets (164A-164N). Each of these asset source (108) subcomponents is described below.

In one or many embodiment(s) described herein, any asset source interface (160) may refer to networking hardware (e.g., a network card or adapter), a computer program implementing a logical interface (e.g., an application programming interface (API)) and executing on the underlying hardware of the asset source (108), an interactivity protocol, or any combination thereof, at least configured to enable or facilitate communications (or information exchange) between the asset source (108) and other entities (e.g., any number of proxy nodes (see e.g., FIGS. 1A and 1C)).

In one or many embodiment(s) described herein, and at least in part, any asset source interface (160) may include functionality to: receive any number of asset snapshot creation requests from one or more proxy nodes, where each request specifies an asset (164A-164N) and may be directed to creating an asset snapshot of the asset (164A-164N); provide the received asset snapshot creation request(s) to the asset source controller (162) for processing; obtain any number of asset snapshots from the asset source controller (162), where each asset snapshot may refer to a current point-in-time copy of the asset data and/or metadata representative of, or reflected in, the asset (164A-164N) specified in a corresponding asset snapshot creation request; and transmit the obtained asset snapshot(s) towards the proxy node(s) in reply to the received snapshot creation request(s). One of ordinary skill, however, will appreciate that any asset source interface (160) may perform other functionalities without departing from the scope of the embodiments described herein.

In one or many embodiment(s) described herein, the asset source controller (162) may refer to instruction-processing hardware (e.g., any number of integrated circuits for processing computer readable instructions), a computer program executing on the underlying hardware of the asset source (108), or any combination thereof, at least configured to oversee and/or manage asset source (108) operations.

In one or many embodiment(s) described herein, and at least in part, the asset source controller (162) may include functionality to: obtain any number of asset snapshot creation requests from one or more proxy nodes via the asset source interface(s) (160), where each request specifies an asset (164A-164N); create any number of asset snapshots through one or more existing snapshot creation procedures, where each asset snapshot refers to a current point-in-time copy of the asset data and/or metadata representative of, or reflected in, the asset (164A-164N) specified in a corresponding asset snapshot creation request; and provide the created asset snapshot(s) to the asset source interface(s) (160) for transmission towards the proxy node(s) in reply to the received snapshot creation request(s) therefrom. One of ordinary skill, however, will appreciate that the asset source controller (162) may perform other functionalities without departing from the scope of the embodiments described herein.

In one or many embodiment(s) described herein, any asset (164A-164N) may refer to any physical or logical construct configured to access and/or maintain enterprise information (e.g., data, metadata, and/or state). Said enterprise information may, for example, be pertinent to enterprise operations and/or services. Further, said enterprise information, on any asset (164A-164N), may be organized and accessible through one or more file system implementations (e.g., disk file system(s), distributed file system(s), etc.). Examples of any asset (164A-164N) may include local storage, network attached storage (NAS) shares, virtual machines, and database applications. Any asset (164A-164N), moreover, is not limited to the aforementioned specific examples.

While FIG. 1D shows a configuration of components and/or subcomponents, other asset source (108) configurations may be used without departing from the scope of the embodiments described herein.

Figure 1E:
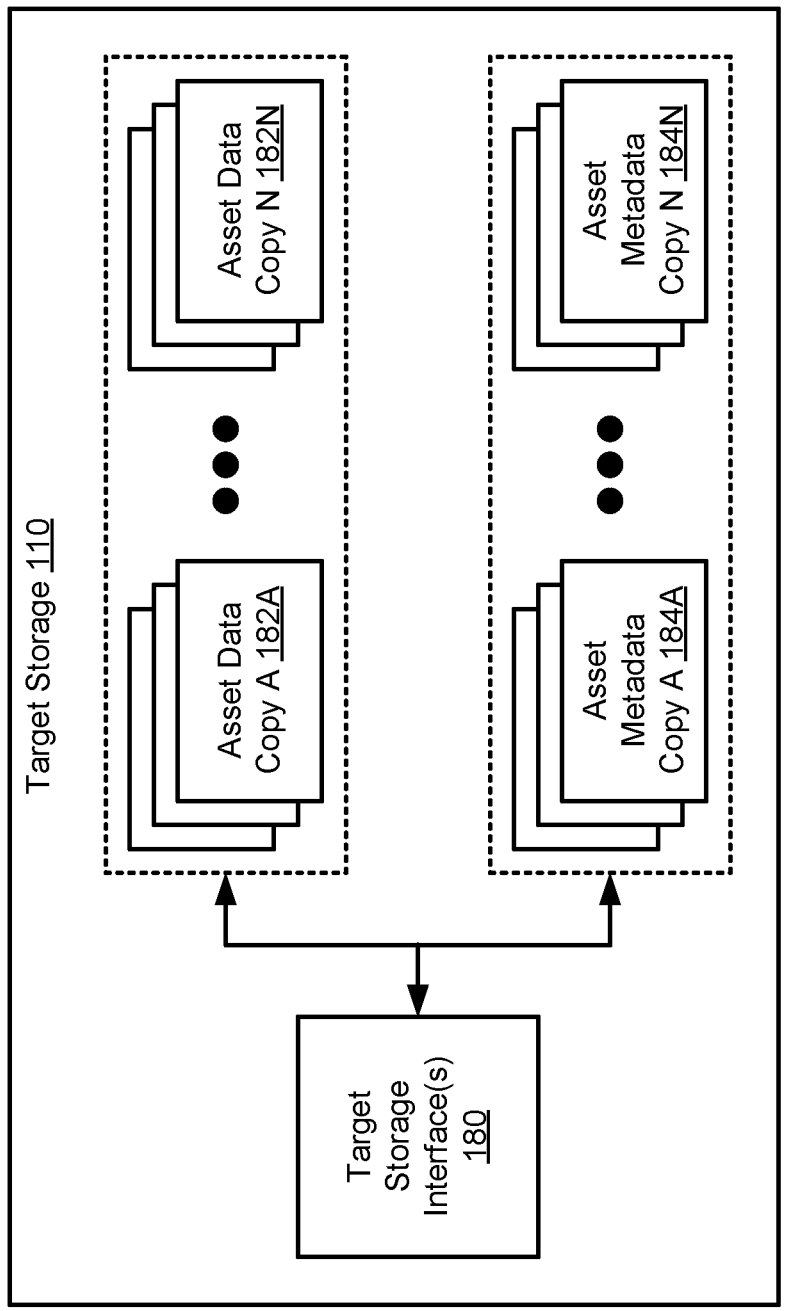
FIG. 1E shows a target storage in accordance with one or more embodiments described herein.

FIG. 1E shows a target storage in accordance with one or more embodiments described herein. The target storage (110) may include any number of target storage interfaces (180), any number of asset data copies (182A-182N), and any number of asset metadata copies (184A-184N). Each of these target storage (110) subcomponents is described below.

In one or many embodiment(s) described herein, any target storage interface (180) may refer to networking hardware (e.g., a network card or adapter), a computer program implementing a logical interface (e.g., an application programming interface (API)) and executing on the underlying hardware of the target storage (110), an interactivity protocol, or any combination thereof, configured to enable or facilitate communications (or information exchange) between the target storage (110) and other entities (e.g., any number of proxy nodes (see e.g., FIGS. 1A and 1C)).

In one or many embodiment(s) described herein, and at least in part, any target storage interface (180) may include functionality to: receive, from the proxy node(s), any number of write requests including any asset data copy (182A-182N) and/or any asset metadata copy (184A-184N) (both described below) for any number of assets (see e.g., FIG. 1D) involved in any number of backup operations; store the received asset data copy/copies (182A-182N) and/or asset metadata copy/copies (184A-184N) in response to the received write request(s); receive, from the proxy node(s), any number of read requests specifying any asset data copy (182A-182N) and/or any asset metadata copy (184A-184N) for any number of assets involved in any number of recovery operations; and transmit said specified asset data copy/copies (182A-182N) and/or asset metadata copy/copies (184A-184N) to the proxy node(s) in response to the received read request(s). One of ordinary skill, however, will appreciate that any target storage interface (180) may perform other functionalities without departing from the scope of the embodiments described herein.

In one or many embodiment(s) described herein, any asset data copy (182A-182N) may refer to a backup copy of any number of file system objects (e.g., directories and/or files) belonging to an asset (see e.g., FIG. 1D). The file system object(s), in turn, may store the asset data, or any granularity thereof, maintained on/by the asset.

In one or many embodiment(s) described herein, any asset metadata copy (184A-184N) may refer to a backup copy of any information descriptive of a corresponding asset data copy (182A-182N), where the asset metadata copy (184A-184N) also belongs to an asset to which the corresponding asset data copy (182A-182N) belongs.

While FIG. 1E shows a configuration of components and/or subcomponents, other target storage (110) configurations may be used without departing from the scope of the embodiments described herein.

FIGS. 2A-2F show a flowchart describing a method for processing sizing requests in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Figure 2A:
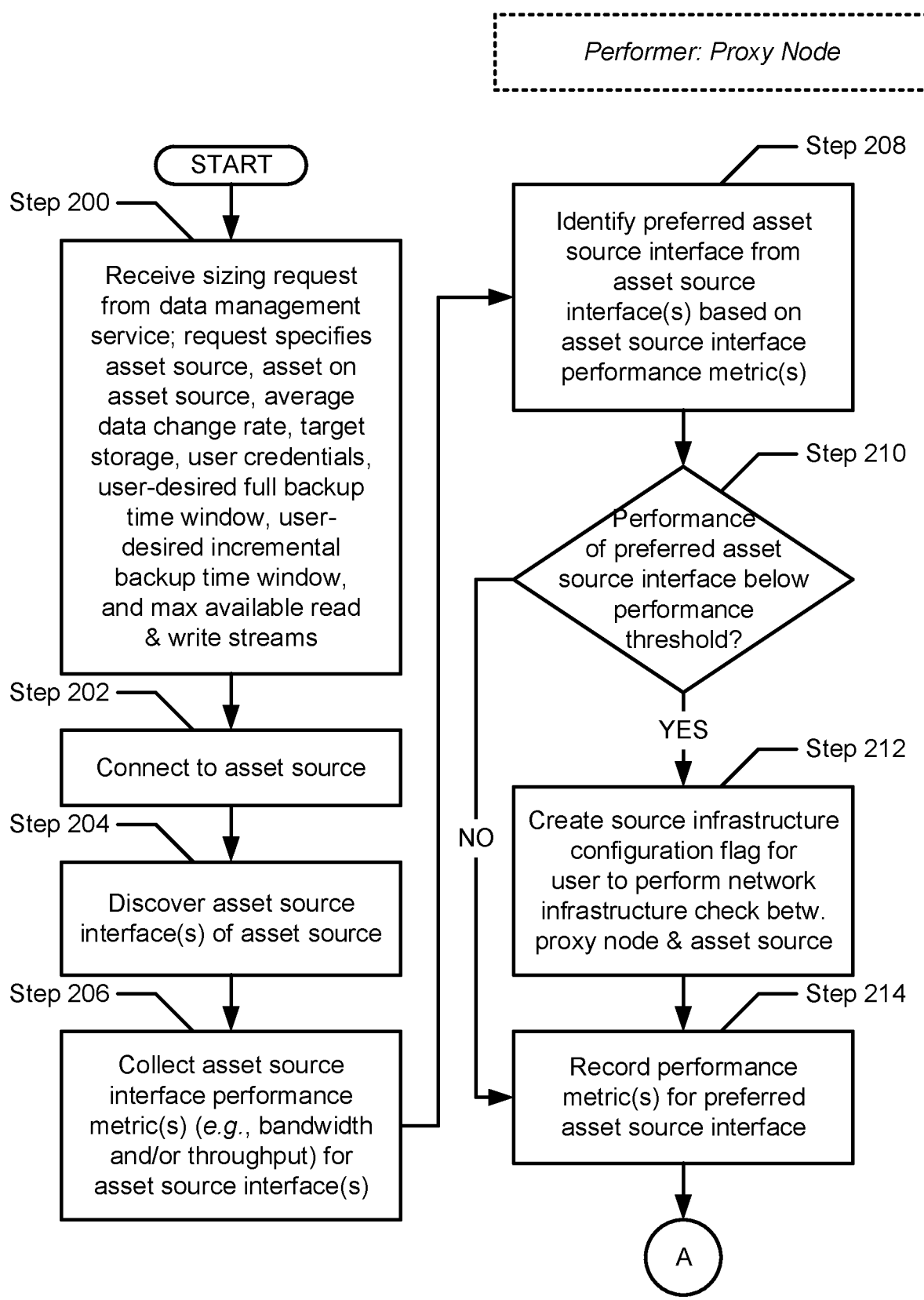
FIGS. 2A-2F show a flowchart describing a method for processing sizing requests in accordance with one or more embodiments described herein.

Turning to FIG. 2A, in Step 200, a sizing request is received from the data management service (see e.g., FIGS. 1A and 1B). In one or many embodiment(s) described herein, the sizing request may pertain to executing a backup infrastructure assessment capturing the current viability, as well as providing any alert(s) and/or recommendation(s) pertinent to an optimal environment sizing, of the backup infrastructure to conduct any asset protection (i.e., backup and/or recovery) operations entailing an asset and according to an asset protection policy associated therewith. The optimal environment sizing, in turn, may refer to an ideal backup infrastructure configuration (e.g., number of proxy nodes, number of read and/or write streams per proxy node, etc.) sufficing backup and/or recovery requirements and properties specified in the asset protection policy. Further, said backup infrastructure may reference at least a portion of a system (see e.g., FIG. 1A), including any number of proxy nodes (see e.g., FIG. 1C), any number of asset sources (see e.g., FIG. 1D), any number of target storages (see e.g., FIG. 1E), and any network fabric(s) there-between.

In one or many embodiment(s) described herein, the sizing request may include or specify an asset protection policy covering (or configured for) an asset. The asset protection policy may encompass a set of rules and procedures outlining a strategy for protecting (e.g., via any number of backup operations) data and/or metadata maintained on the asset (see e.g., FIG. 1D). The set of rules and procedures may, for example, dictate: which asset data and/or metadata maintained on the asset should be protected; on which asset source is the asset hosted or through which asset source is the asset accessible; where (e.g., one or more target storages) should backup copies (e.g., asset data and/or metadata copies (see e.g., FIG. 1E)) of any protected asset data and/or metadata be stored; how often should a backup operation centered about the asset transpire; and how long should any backup copies of any protected asset data and/or metadata be retained. Said set of rules and procedures are not limited to the aforementioned specific examples.

In one or many embodiment(s) described herein, the asset protection policy may additionally reflect a list of user-defined requirements and/or properties pertinent to the protection (e.g., via any number of backup operations) of asset data and/or metadata maintained on the asset. The user-defined requirements and/or properties may, for example, include: an average data change rate (expressed as a percentage of storage space consumed by any data) for the asset observed through a specified time period (e.g., one day, one week, etc.); user credentials, belonging to any administrator(s), providing access and protection authority directed to the asset; a user-desired full backup time window reflecting a maximum time period in which a full backup of the asset should complete; a user-desired incremental backup time window reflecting a maximum time period in which an incremental backup of the asset should complete; a maximum number of available read streams that may be allocated towards the reading (or retrieving) of asset data and/or metadata of the asset from the specified asset source (during any backup operations) or from the specified target storage (during any recovery operations); and a maximum number of available write streams that may be allocated towards the writing (or storing) of asset data and/or metadata of the asset to the specified target storage (during any backup operations) or to the specified asset source (during any recovery operations). Said list of user-defined requirements and/or properties are not limited to the aforementioned specific examples.

In Step 202, a connection, to the asset source (specified in the asset protection policy received via the sizing request in Step 200) and by way of a management network fabric at least interconnecting the proxy node and the asset source, is established.

In Step 204, any number of asset source interfaces, belonging to the asset source, is/are discovered. In one or many embodiment(s) described herein, any number of existing network interface discovery techniques may be employed to discover the asset source interface(s).

In Step 206, for each asset source interface (discovered in Step 204), any number of asset source interface performance metrics is/are collected. In one or many embodiment(s) described herein, any asset source interface performance metric may refer to a measurable parameter reflecting a qualitative or quantitative assessment of the network performance exhibited by a given asset source interface. Examples of said asset source interface performance metric(s), for a given asset source interface, may include: a bandwidth—i.e., a maximum (theoretical) amount or capacity of data/information (e.g., typically expressed in bits or bytes per second) that can be received and/or transmitted through the given asset source interface; and a throughput—i.e., a maximum (empirical) amount or capacity of data/information (e.g., typically expressed in bits or bytes per second) that has been received and/or transmitted through the given asset source interface. Further, said asset source interface performance metric(s), for any given asset source interface, is/are not limited to the aforementioned specific examples.

In Step 208, from the asset source interface(s) (discovered in Step 204), a preferred asset source interface is identified. In one or many embodiment(s) described herein, identification of the preferred asset source interface may be influenced by the asset source interface performance metric(s) (collected in Step 206). Particularly, the preferred asset source interface may be identified as the asset source interface, of the discovered asset source interface(s), that exhibits the best asset source interface performance metric(s) (e.g., a highest bandwidth and/or throughput). The preferred asset source interface, accordingly, may refer to an asset source interface that exhibits the best or optimal network performance.

In Step 210, a determination is made as to whether the asset source interface performance metric(s) (collected in Step 206) for the preferred asset source interface (identified in Step 208) falls below any performance metric threshold(s). For example, if the preferred asset source interface represents a 10 Gigabit Ethernet (GbE) port, then the average read and write throughput associated therewith should ideally range between 800 and 900 megabits per second (Mbps). In said example, the performance metric threshold, respective to network throughput, may be set to the lower end of said range—i.e., 800 Mbps. As such, in one or many embodiment(s) described herein, if it is determined that any asset source interface performance metric(s) for the preferred asset source interface falls below any corresponding performance metric threshold(s), then the method proceeds to Step 212. On the other hand, in one or many other embodiment(s) described herein, if it is alternatively determined that any asset source interface performance metric(s) for the preferred asset source interface matches or exceeds any corresponding performance metric threshold(s), then the method alternatively proceeds to Step 214.

In Step 212, following the determination (made in Step 210) that any asset source interface performance metric(s) (collected in Step 206) for the preferred asset source interface (identified in Step 208) falls below any corresponding performance metric threshold(s), a source infrastructure configuration flag is created. In one or many embodiment(s) described herein, the source infrastructure configuration flag may refer to an alert, a warning, or a notification directed to informing any administrator(s) that the current backup infrastructure configuration (at least with respect to asset source to proxy node network performance) is subpar to ideal conditions. In responding to the source infrastructure configuration flag, any administrator(s) may tune the current backup infrastructure configuration to address or resolve any shortcomings involving any network connectivity between the asset source (specified in the asset protection policy received via the sizing request in Step 200) and the proxy node (performing the instant method).

In Step 214, following creation of the source infrastructure configuration flag (performed in Step 212), or following the alternate determination (made in Step 210) that any asset source interface performance metric(s) (collected in Step 206) for the preferred asset source interface (identified in Step 208) matches/exceeds any corresponding performance metric threshold(s), the asset source interface performance metric(s) for the preferred asset source interface is/are recorded.

Hereinafter, the method proceeds to Step 218 (see e.g., FIG. 2B).

Figure 2B:
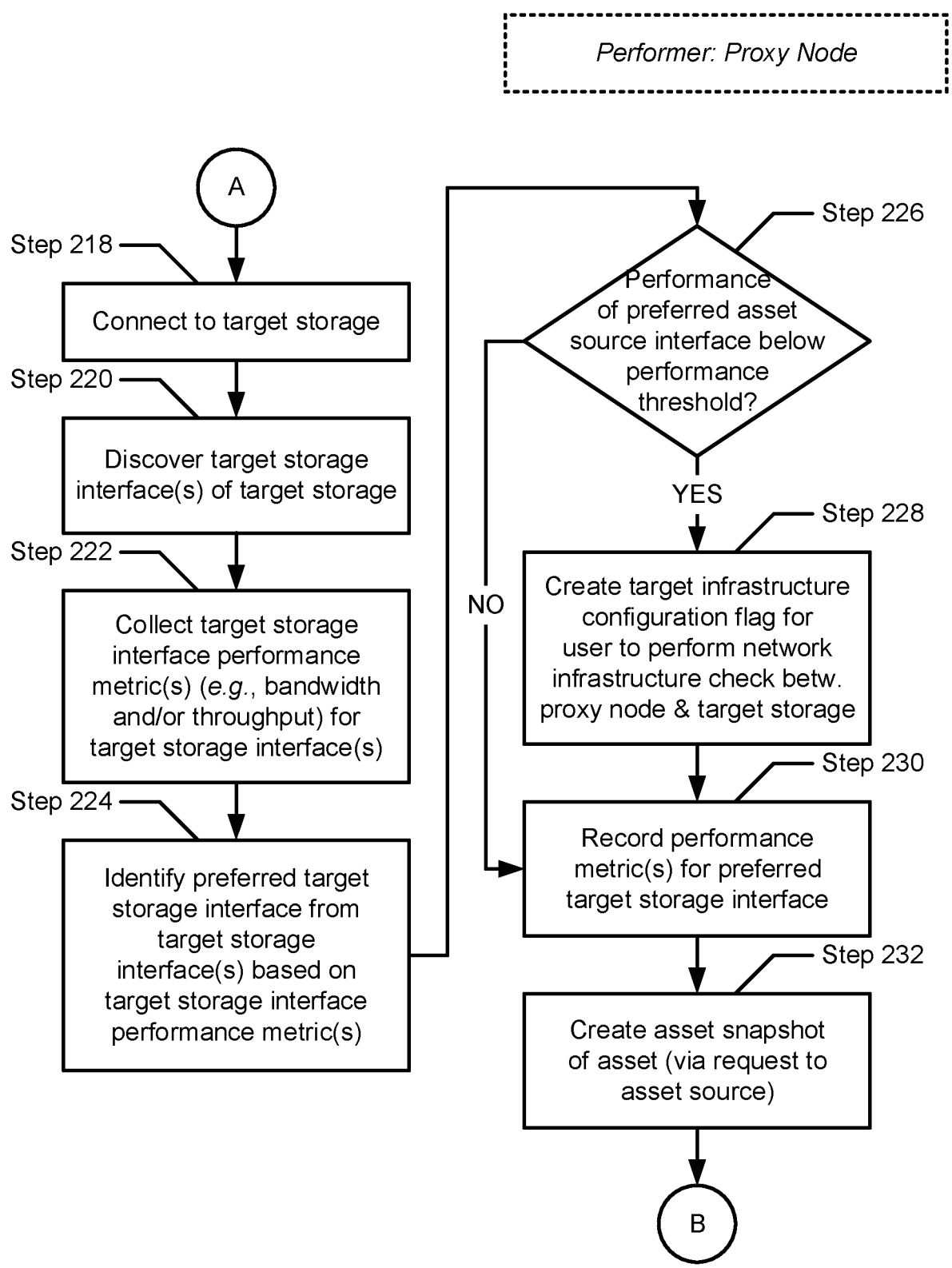

Turning to FIG. 2B, in Step 218, a connection, to the target storage (specified in the asset protection policy received via the sizing request in Step 200) and by way of a management network fabric at least interconnecting the proxy node and the target storage, is established.

In Step 220, any number of target storage interfaces, belonging to the target storage, is/are discovered. In one or many embodiment(s) described herein, any number of existing network interface discovery techniques may be employed to discover the target storage interface(s).

In Step 222, for each target storage interface (discovered in Step 220), any number of target storage interface performance metrics is/are collected. In one or many embodiment(s) described herein, any target storage interface performance metric may refer to a measurable parameter reflecting a qualitative or quantitative assessment of the network performance exhibited by a given target storage interface. Examples of said target storage interface performance metric(s), for a given target storage interface, may include: a bandwidth—i.e., a maximum (theoretical) amount or capacity of data/information (e.g., typically expressed in bits or bytes per second) that can be received and/or transmitted through the given target storage interface; and a throughput—i.e., a maximum (empirical) amount or capacity of data/information (e.g., typically expressed in bits or bytes per second) that has been received and/or transmitted through the given target storage interface. Further, said target storage interface performance metric(s), for any given target storage interface, is/are not limited to the aforementioned specific examples.

In Step 224, from the target storage interface(s) (discovered in Step 220), a preferred target storage interface is identified. In one or many embodiment(s) described herein, identification of the preferred target storage interface may be influenced by the target storage interface performance metric(s) (collected in Step 222). Particularly, the preferred target storage interface may be identified as the target storage interface, of the discovered target storage interface(s), that exhibits the best target storage interface performance metric(s) (e.g., a highest bandwidth and/or throughput). The preferred target storage interface, accordingly, may refer to a target storage interface that exhibits the best or optimal network performance.

In Step 226, a determination is made as to whether the target storage interface performance metric(s) (collected in Step 222) for the preferred target storage interface (identified in Step 224) falls below any performance metric threshold(s). For example, if the preferred target storage interface represents a 10 Gigabit Ethernet (GbE) port, then the average read and write throughput associated therewith should ideally range between 800 and 900 megabits per second (Mbps). In said example, the performance metric threshold, respective to network throughput, may be set to the lower end of said range—i.e., 800 Mbps. As such, in one or many embodiment(s) described herein, if it is determined that any target storage interface performance metric(s) for the preferred target storage interface falls below any corresponding performance metric threshold(s), then the method proceeds to Step 228. On the other hand, in one or many other embodiment(s) described herein, if it is alternatively determined that any target storage interface performance metric(s) for the preferred target storage interface matches or exceeds any corresponding performance metric threshold(s), then the method alternatively proceeds to Step 230.

In Step 228, following the determination (made in Step 226) that any target storage interface performance metric(s) (collected in Step 222) for the preferred target storage interface (identified in Step 224) falls below any corresponding performance metric threshold(s), a target infrastructure configuration flag is created. In one or many embodiment(s) described herein, the target infrastructure configuration flag may refer to an alert, a warning, or a notification directed to informing any administrator(s) that the current backup infrastructure configuration (at least with respect to target storage to proxy node network performance) is subpar to ideal conditions. In responding to the target infrastructure configuration flag, any administrator(s) may tune the current backup infrastructure configuration to address or resolve any shortcomings involving any network connectivity between the target storage (specified in the asset protection policy received via the sizing request in Step 200) and the proxy node (performing the instant method).

In Step 230, following creation of the target infrastructure configuration flag (performed in Step 228), or following the alternate determination (made in Step 226) that any target storage interface performance metric(s) (collected in Step 222) for the preferred target storage interface (identified in Step 224) matches/exceeds any corresponding performance metric threshold(s), the target storage interface performance metric(s) for the preferred target storage interface is/are recorded.

In Step 232, an asset snapshot, of the asset (specified in the asset protection policy received via the sizing request in Step 200), is created. In one or many embodiment(s) described herein, the asset snapshot may refer to a copy of the asset data and/or metadata, representative of or reflected in the asset, at a current point-in-time. The asset, meanwhile, may be hosted on or accessible through the asset source (also specified in the asset protection policy received via the sizing request in Step 200). Further, creation of the asset snapshot may be facilitated via an asset snapshot creation request directed to the asset source.

Hereinafter, the method proceeds to Step 236 (see e.g., FIG. 2C).

Figure 2C:
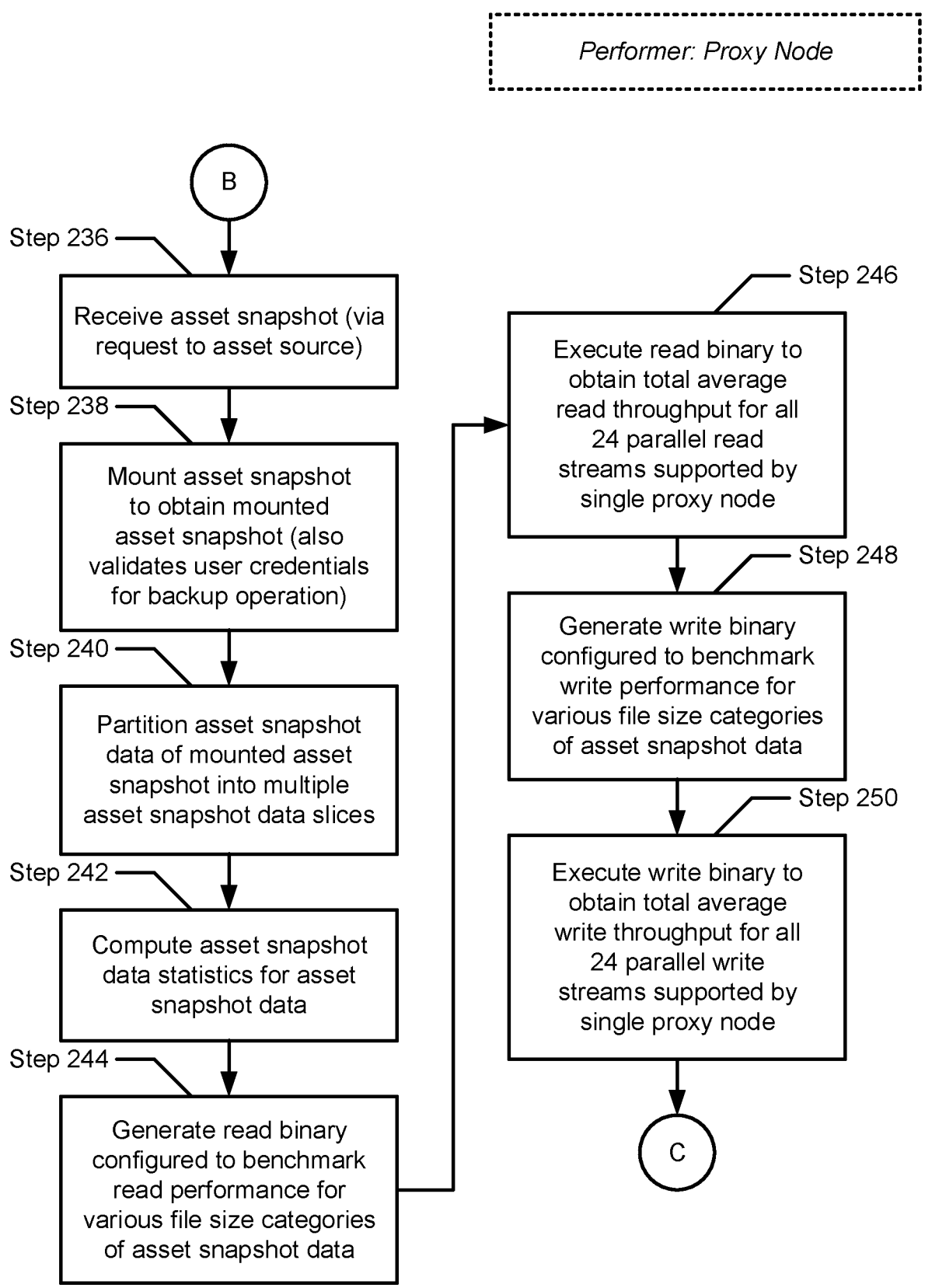

Turning to FIG. 2C, in Step 236, the asset snapshot (created in Step 232) is received. In one or many embodiment(s) described herein, said receipt of the asset snapshot may be facilitated via an asset snapshot sharing request directed to the asset source and thus also received therefrom in response to said request.

In Step 238, the asset snapshot (received in Step 236) is mounted. Particularly, in one or many embodiment(s) described herein, mounting of the asset snapshot may entail configuring any file system implementation(s), representative of the asset snapshot, read and/or write accessible (locally on or through the proxy node performing the instant method). The asset snapshot, once mounted, may also be referred to herein as a mounted asset snapshot. Mounting of the asset snapshot may, furthermore, validate any user credentials (specified in the asset protection policy received via the sizing request in Step 200) necessary for administrator authorization of any asset protection (i.e., backup or recovery) operation prepping to be performed.

In Step 240, asset snapshot data, of the mounted asset snapshot (obtained in Step 238), is partitioned into multiple asset snapshot data slices. In one or many embodiment(s) described herein, the multiple asset snapshot data slices may be created, respectively, using multiple concurrent or parallel threads. Further, each asset snapshot data slice may be created such that an asset snapshot data slice size thereof does not exceed a predefined asset snapshot data slice size expressed either in bytes (e.g., 20 giga-bytes) or in a number of file system objects (e.g., 1,000 directories and/or files). Moreover, as the mounted asset snapshot may encompass enterprise information (e.g., asset data and/or asset metadata) organized and accessible through one or more file system implementations, each asset snapshot data slice created therefrom may include a portion of said enterprise information, as well as a corresponding portion of said file system implementation(s) respectively organizing and providing accessibility to said enterprise information portion.

In Step 242, asset snapshot data statistics, for the asset snapshot data (partitioned in Step 240), are created. In one or many embodiment(s) described herein, any asset snapshot data statistic may refer to metadata descriptive, and/or datum representative, of the asset snapshot data. Examples of the asset snapshot data statistics may include, but are not limited to: a total data size (e.g., expressed in bytes) of the asset snapshot data; a cardinality (or number) of asset snapshot data slices obtained through partitioning of the asset snapshot data; a cardinality (or number) of files, at least in part, forming the asset snapshot data; a cardinality (or number) of directories, at least in another part, forming the asset snapshot data; a file size histogram reflecting a distribution of the asset snapshot data by/across various file size categories/classes (e.g., 0-32 KB, 32-64 KB, 64-128 KB, 128-256 KB, 256-512 KB, 512 KB-1 MB, 1-4 MB, and >4 MB); and an average file size reflected across the asset snapshot data, which may be computed using the total data size and the cardinality/number of files (i.e., average file size=total data size/number of files).

In Step 244, a read binary is generated. In one or many embodiment(s) described herein, the read binary may refer to computer readable program code (or machine code), which when executed by any number of computer processors, configure/enable said computer processor(s) to perform any number of benchmark assessments capturing file read performances. Said benchmark assessment(s), more specifically, may each measure a read throughput observed while retrieving files (that may be classified into a file size category (exemplified above)) from a portion of the asset snapshot data of the mounted asset snapshot (obtained in Step 238), where said portion of the asset snapshot data may be defined by or included within an asset snapshot data slice (obtained in Step 240).

In Step 246, the read binary (generated in Step 244) is executed. In one or many embodiment(s) described herein, execution of said read binary may trigger multiple read throughput measurements. The multiple read throughput measurements may include: (a) the measurement of a set of (slice) read throughputs for each asset snapshot data slice of the multiple asset snapshot data slices (obtained in Step 240), where any set of (slice) read throughputs collectively pertain to the reading or retrieval of files included in a portion of the asset snapshot data—the portion having been logically defined via the partitioning of the asset snapshot data—respective to a corresponding asset snapshot data slice; and, (b) for each set of (slice) read throughputs, the measurement of an individual (category) read throughput (at least in part forming the set of (slice) read throughputs) for each file size category of the various file size categories (exemplified above) represented in the file size histogram (obtained in Step 242), where any individual (category) read throughput pertains to the reading or retrieval of at least a files subset—classified into one of the file size categories—of the files included in the portion of the asset snapshot data respective to the corresponding asset snapshot data slice associated with the set of (slice) read throughputs. Each read throughput measurement, of the multiple read throughput measurements, furthermore, may be executed through a parallel processing thread, which may employ any one parallel read stream supported by any single proxy node of the backup infrastructure.

Thereafter, in one or many embodiment(s) described herein, a total average (node) read throughput is computed from at least the above-mentioned multiple read throughput measurements. Particularly, said computation may include: (a) for each file size category of the various file size categories represented in the file size histogram (obtained in Step 242), identifying a set of (category) read throughputs including the individual (category) read throughput measured from the reading/retrieval of the at least files subset—classified into the file size category—of the files included in the portion of the asset snapshot data respective to each corresponding asset snapshot data slice of the multiple asset snapshot data slices (obtained in Step 240), thereby obtaining multiple sets of (category) read throughputs; (b) computing a set of average (category) read throughputs including an average (category) read throughput for each file size category, which may be derived by averaging the set of (category) read throughputs identified for and corresponding to the file size category; (c) computing a set of total average (category) read throughputs including a total average (category) read throughput for each file size category, which may be derived by multiplying the average (category) read throughput corresponding to the file size category with a maximum number (e.g., 24) of parallel read streams supported by any single proxy node of the backup infrastructure; (d) and computing the total average (node) read throughput by averaging the set of total average (category) read throughputs, which may be representative of the average read rate attainable by any single proxy node of the backup infrastructure through utilization of all their parallel read streams to read/retrieve the asset snapshot data of the mounted asset snapshot (obtained in Step 238).

In Step 248, a write binary is generated. In one or many embodiment(s) described herein, the write binary may refer to computer readable program code (or machine code), which when executed by any number of computer processors, configure/enable said computer processor(s) to perform any number of benchmark assessments capturing file write performances. Said benchmark assessment(s), more specifically, may each measure a write throughput observed while storing files (that may be classified into a file size category (exemplified above)) from a portion of the asset snapshot data of the mounted asset snapshot (obtained in Step 238), where said portion of the asset snapshot data may be defined by or included within an asset snapshot data slice (obtained in Step 240).

In Step 250, the write binary (generated in Step 248) is executed. In one or many embodiment(s) described herein, execution of said write binary may trigger multiple write throughput measurements. The multiple write throughput measurements may include: (a) the measurement of a set of (slice) write throughputs for each asset snapshot data slice of the multiple asset snapshot data slices (obtained in Step 240), where any set of (slice) write throughputs collectively pertain to the writing or storing of files included in a portion of the asset snapshot data—the portion having been logically defined via the partitioning of the asset snapshot data—respective to a corresponding asset snapshot data slice; and, (b) for each set of (slice) write throughputs, the measurement of an individual (category) write throughput (at least in part forming the set of (slice) write throughputs) for each file size category of the various file size categories (exemplified above) represented in the file size histogram (obtained in Step 242), where any individual (category) write throughput pertains to the writing or storing of at least a files subset—classified into one of the file size categories—of the files included in the portion of the asset snapshot data respective to the corresponding asset snapshot data slice associated with the set of (slice) write throughputs. Each write throughput measurement, of the multiple write throughput measurements, furthermore, may be executed through a parallel processing thread, which may employ any one parallel write stream supported by any single proxy node of the backup infrastructure.

Thereafter, in one or many embodiment(s) described herein, a total average (node) write throughput is computed from at least the above-mentioned multiple write throughput measurements. Particularly, said computation may include: (a) for each file size category of the various file size categories represented in the file size histogram (obtained in Step 242), identifying a set of (category) write throughputs including the individual (category) write throughput measured from the writing/storing of the at least files subset—classified into the file size category—of the files included in the portion of the asset snapshot data respective to each corresponding asset snapshot data slice of the multiple asset snapshot data slices (obtained in Step 240), thereby obtaining multiple sets of (category) write throughputs; (b) computing a set of average (category) write throughputs including an average (category) write throughput for each file size category, which may be derived by averaging the set of (category) write throughputs identified for and corresponding to the file size category; (c) computing a set of total average (category) write throughputs including a total average (category) write throughput for each file size category, which may be derived by multiplying the average (category) write throughput corresponding to the file size category with a maximum number (e.g., 24) of parallel write streams supported by any single proxy node of the backup infrastructure; (d) and computing the total average (node) write throughput by averaging the set of total average (category) write throughputs, which may be representative of the average write rate attainable by any single proxy node of the backup infrastructure through utilization of all their parallel write streams to write/store the asset snapshot data of the mounted asset snapshot (obtained in Step 238).

Hereinafter, the method proceeds to Step 254 (see e.g., FIG. 2D).

Figure 2D:
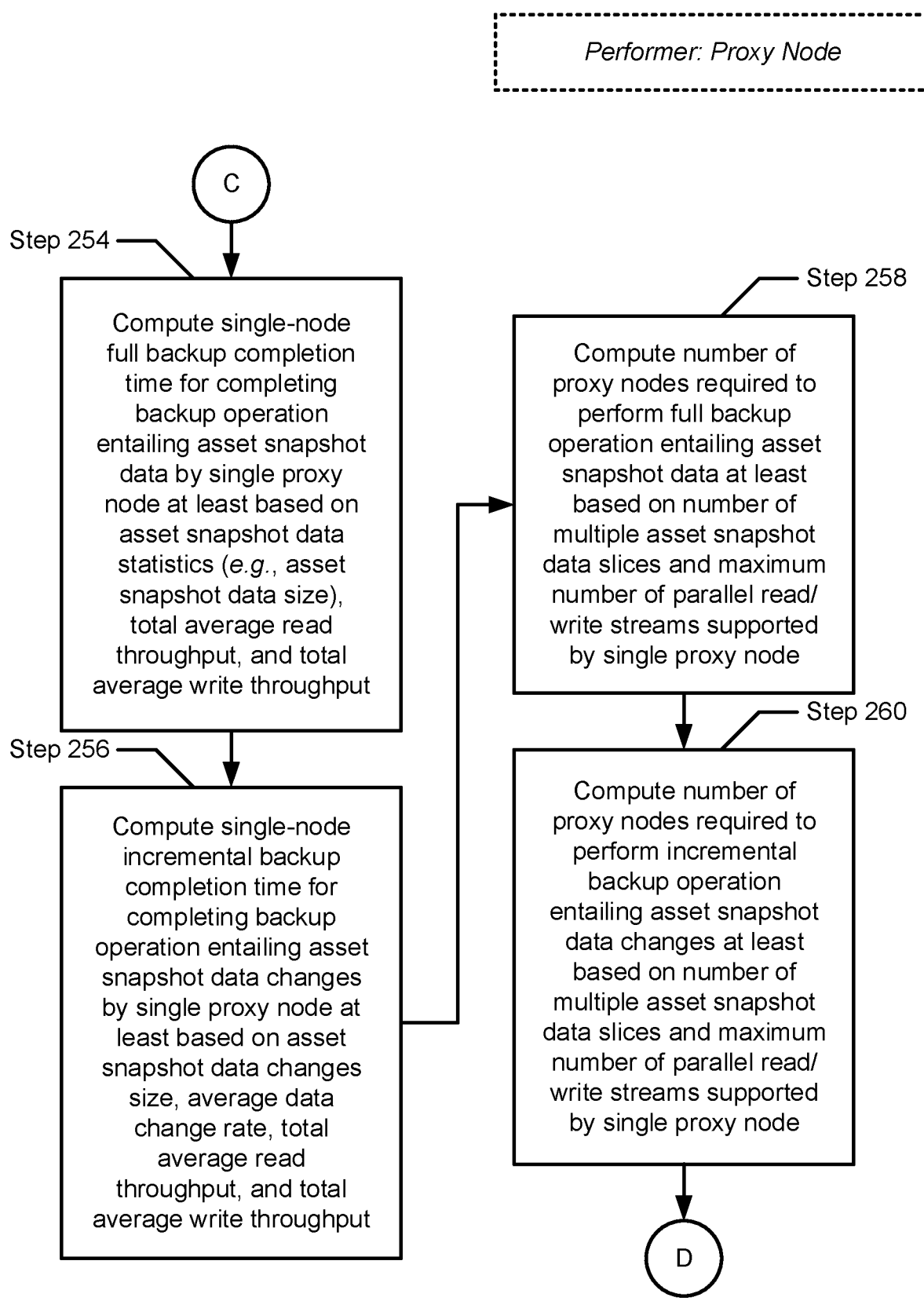

Turning to FIG. 2D, in Step 254, a single-node full backup completion time is computed. In one or many embodiment(s) described herein, the single-node full backup completion time may refer to an estimated time period through which a prospective full backup (entailing the asset snapshot data) may be completed by any single proxy node of the backup infrastructure. Further, computation of the single-node full backup completion time may include: (a) deriving a single-node full backup read completion time, referring to an estimated time period through which the reading/retrieval of the entirety of the asset snapshot data from the mounted asset snapshot (obtained Step 238) completes, by multiplying the asset snapshot data size (obtained in Step 242 as part of the computed asset snapshot data statistics) with the total average (node) read throughput (computed in Step 246); (b) deriving a single-node full backup write completion time, referring to an estimated time period through which the writing/storing of the entirety of the asset snapshot data to the target storage (specified in the asset protection policy received via the sizing request in Step 200) completes, by multiplying the asset snapshot data size with the total average (node) write throughput (computed in Step 250); and (c) deriving the single-node full backup completion time by summing the single-node full backup read completion time and the single-node full backup write completion time.

In Step 256, a single-node incremental backup completion time is computed. In one or many embodiment(s) described herein, the single-node incremental backup completion time may refer to an estimated time period through which a prospective incremental backup (entailing any prospective change(s) to the asset snapshot data) may be completed by any single proxy node of the backup infrastructure. Further, computation of the single-node incremental backup completion time may include: (a) deriving an asset snapshot data changes size, referring to an estimated amount of storage space consumed by estimated change(s) to the asset snapshot data over a specified time period, by multiplying the asset snapshot data size (obtained in Step 242 as part of the computed asset snapshot data statistics) with the average data change rate (specified in the asset protection policy received via the sizing request in Step 200); (b) deriving a single-node incremental backup read completion time, referring to an estimated time period through which the reading/retrieval of the estimated change(s) to the asset snapshot data from the mounted asset snapshot (obtained Step 238) completes, by multiplying the asset snapshot data changes size and the total average (node) read throughput (computed in Step 246); (c) deriving a single-node incremental backup write completion time, referring to an estimated time period through which the writing/storing of the estimated change(s) to the asset snapshot data to the target storage (specified in the asset protection policy received via the sizing request in Step 200) completes, by multiplying the asset snapshot data changes size and the total average (node) write throughput (computed in Step 250); and (d) deriving the single-node incremental backup completion time by summing the single-node incremental backup read completion time and the single-node incremental backup write completion time.

In Step 258, a number of proxy nodes (see e.g., FIGS. 1A and 1C), required to perform any prospective full backup operation entailing the asset snapshot data, is computed. In one or many embodiment(s) described herein, computation of said number of proxy nodes may include: (a) assuming that a reading (or writing) of each asset snapshot data slice of the multiple asset snapshot data slices (obtained in Step 240) may commandeer one parallel read (or write) stream of a maximum number (e.g., 24) of parallel read (or write) streams supported by any single proxy node of the backup infrastructure; and (b) based on said assumption, deriving a (rational) number of proxy nodes through division of a cardinality (or number) of the multiple asset snapshot data slices with the maximum number of parallel read (or write) streams supported by any single proxy node of the backup infrastructure; and (c) deriving the number of proxy nodes by rounding up the (rational) number of proxy nodes to a nearest whole number.

In Step 260, a number of proxy nodes (see e.g., FIGS. 1A and 1C), required to perform any incremental backup operation, is computed. In one or many embodiment(s) described herein, computation of said number of proxy nodes may include: (a) assuming that a reading (or writing) of each asset snapshot data slice of the multiple asset snapshot data slices (obtained in Step 240) may commandeer one parallel read (or write) stream of a maximum number (e.g., 24) of parallel read (or write) streams supported by any single proxy node of the backup infrastructure; and (b) based on said assumption, deriving a (rational) number of proxy nodes through division of a cardinality (or number) of the multiple asset snapshot data slices with the maximum number of parallel read (or write) streams supported by any single proxy node of the backup infrastructure; and (c) deriving the number of proxy nodes by rounding up the (rational) number of proxy nodes to a nearest whole number.

Hereinafter, the method proceeds to Step 264 (see e.g., FIG. 2E).

Figure 2E:
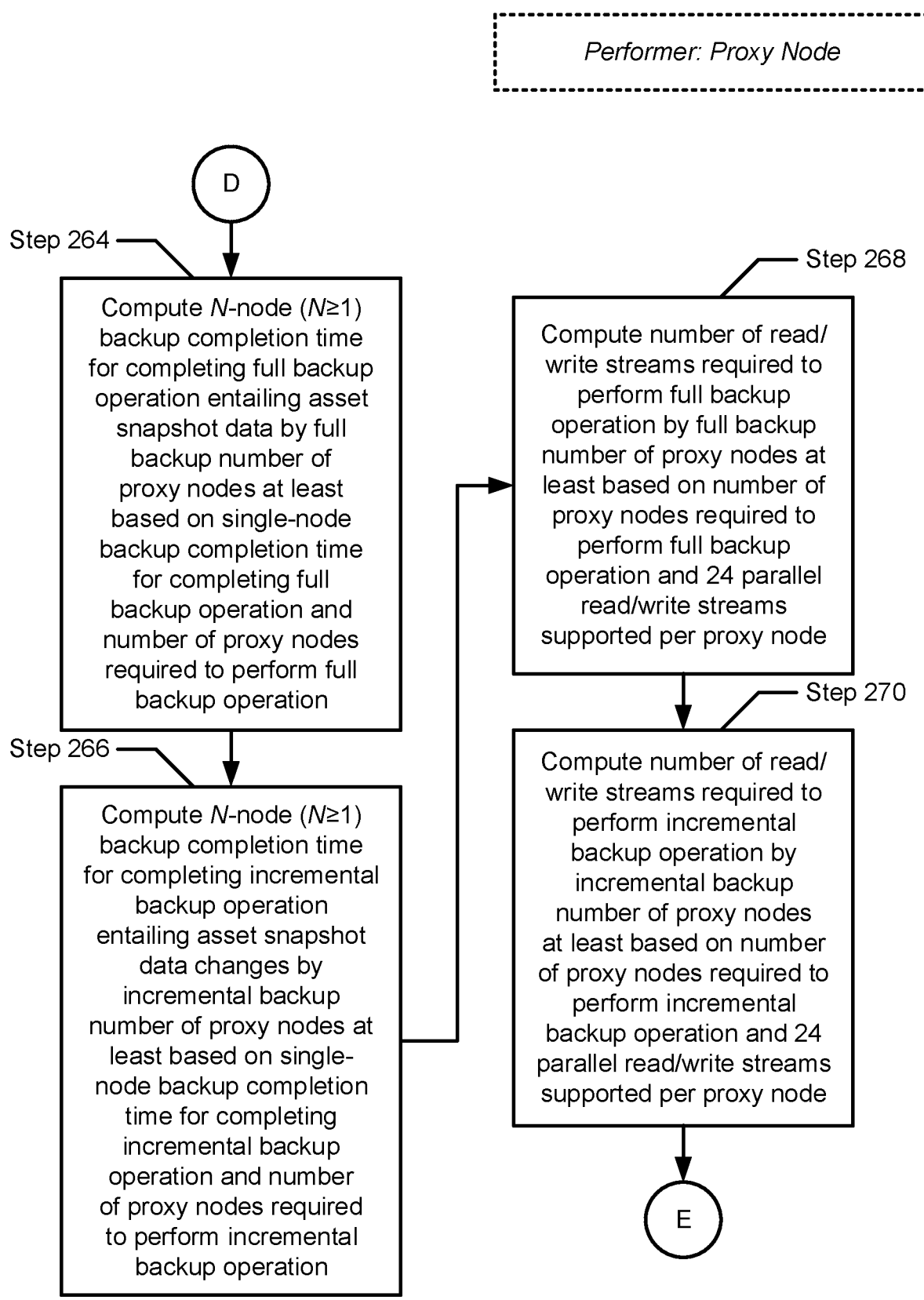

Turning to FIG. 2E, in Step 264, a N-node full backup completion time is computed. In one or many embodiment(s) described herein, computation of the N-node full backup completion time may be based on the single-node full backup completion time (computed in Step 254) and the number of proxy nodes required to perform any prospective full backup operation entailing the asset snapshot data (computed in Step 258).

In Step 266, a N-node incremental backup completion time is computed. In one or many embodiment(s) described herein, computation of the N-node incremental backup completion time may be based on the single-node incremental backup completion time (computed in Step 256) and the number of proxy nodes required to perform any prospective incremental backup operation entailing the estimated asset snapshot data changes (computed in Step 260).

In Step 268, a number of read (as well as a number of write) streams, required to perform any N-node full backup operation, is computed. In one or many embodiment(s) described herein, computation of said number of read (or write) streams may be based on the number of proxy nodes required to perform any prospective full backup operation entailing the asset snapshot data (computed in Step 258) and the maximum number of parallel read (or write) streams supported by any single proxy node of the backup infrastructure.

In Step 270, a number of read (as well as a number of write) streams, required to perform any N-node incremental backup operation, is computed. In one or many embodiment(s) described herein, computation of said number of read (or write) streams may be based on the number of proxy nodes required to perform any prospective incremental backup operation entailing the estimated asset snapshot data changes (computed in Step 260) and the maximum number of parallel read (or write) streams supported by any single proxy node of the backup infrastructure Hereinafter, the method proceeds to Step 274 (see e.g., FIG. 2F).

Figure 2F:
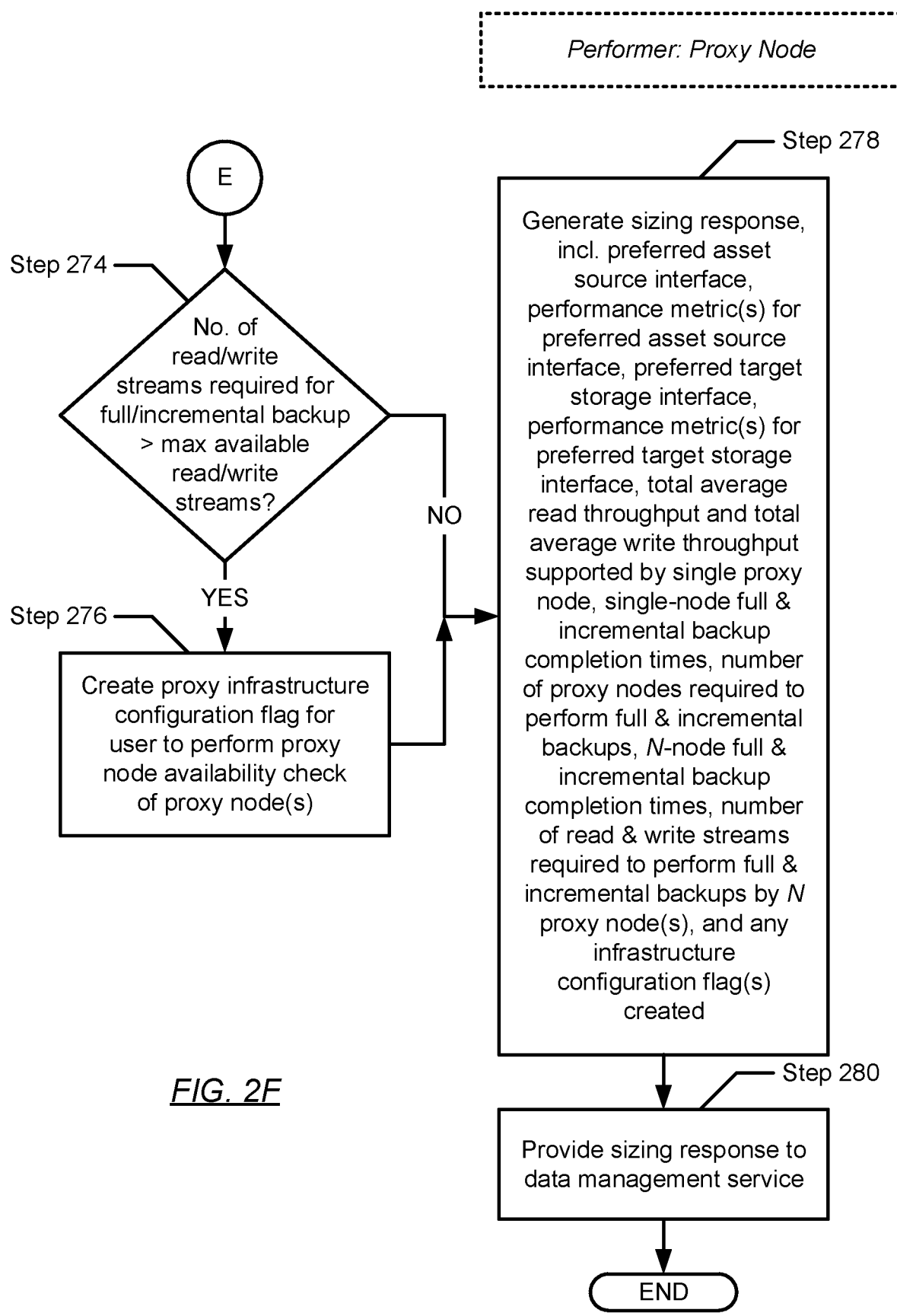

Turning to FIG. 2F, in Step 274, a determination is made as to whether various conditions are collectively met. Said various conditions may include: (a) whether the number of read streams (computed in Step 268), required to perform any N-node full backup operation, exceeds the maximum number of available read streams (specified in the asset protection policy received via the sizing request in Step 200); (b) whether the number of read streams (computed in Step 270), required to perform any N-node incremental backup operation, exceeds said maximum number of available read streams; (c) whether the number of write streams (also computed in Step 268), required to perform any N-node full backup operation, exceeds the maximum number of available write streams (also specified in the asset protection policy received via the sizing request in Step 200); and (d) whether the number of write streams (also computed in Step 270), required to perform any N-node incremental backup operation, exceeds said maximum number of available write streams.

As such, in one or many embodiment(s) described herein, if it is determined that at least one of above-cited conditions (a)-(d) is/are met (i.e., the number of read streams, required to perform any N-node full backup operation, is greater than the maximum number of available read streams; the number of read streams, required to perform any N-node incremental backup operation, is greater than the maximum number of available read streams; the number of write streams, required to perform any N-node full backup operation, is greater than the maximum number of available write streams; and/or the number of write streams, required to perform any N-node incremental backup operation, is greater than the maximum number of available write streams), then the method proceeds to Step 276. On the other hand, in one or many other embodiment(s) described herein, if it is alternatively determined that none of the above-cited conditions (a)-(d) are met (i.e., the number of read streams, required to perform any N-node full backup operation, is equal to or less than the maximum number of available read streams; the number of read streams, required to perform any N-node incremental backup operation, is equal to or less than the maximum number of available read streams; the number of write streams, required to perform any N-node full backup operation, is equal to or less than the maximum number of available write streams; and the number of write streams, required to perform any N-node incremental backup operation, is equal to or less than the maximum number of available write streams), then the method alternatively proceeds to Step 278.

In Step 276, following the determination (made in Step 274) that at least one of above-cited conditions (a)-(d) is/are met, at least one proxy infrastructure configuration flag is created. In one or many embodiment(s) described herein, any source infrastructure configuration flag may refer to an alert, a warning, or a notification directed to informing any administrator(s) of any one above-cited condition that has been met. In responding to any proxy infrastructure configuration flag, any administrator(s) may tune the current backup infrastructure configuration to address or resolve any shortcomings involving the insufficient number of proxy nodes available to support the number of read (or write) streams required to perform any N-node full (or incremental) backup operation.

In Step 278, following creation of the proxy infrastructure configuration flag(s) (performed in Step 276), or following the alternate determination (made in Step 274) that none of above-cited conditions (a)-(d) are met, a sizing response is generated. In one or many embodiment(s) described herein, the sizing response may include a backup infrastructure assessment of the backup infrastructure. Said backup infrastructure assessment, further, may include or specify: the preferred asset source interface (identified in Step 208); the asset source interface performance metric(s) (collected in Step 206) respective to the preferred asset source interface; the preferred target storage interface (identified in Step 224); the target storage interface performance metric(s) (collected in Step 222) respective to the preferred target storage interface; the total average read throughput (obtained in Step 246) supported by any single proxy node; the total average write throughput (obtained in Step 250) supported by any single proxy node; the single-node full backup completion time (computed in Step 254); the single-node incremental backup completion time (computed in Step 256); the number of proxy nodes (computed in Step 258) required to perform any prospective full backup operation entailing the entirety of the asset snapshot data; the number of proxy nodes (computed in Step 260) required to perform any prospective incremental backup operation entailing estimated change(s) to the asset snapshot data; the number of read and write streams (computed in Step 268) required collectively by the number of proxy nodes (computed in Step 258) to support any prospective full backup operation entailing the entirety of the asset snapshot data; the number of read and write streams (computed in Step 270) required collectively by the number of proxy nodes (computed in Step 260) to support any prospective incremental backup operation entailing estimated change(s) to the asset snapshot data; the source infrastructure configuration flag (if any had been created in Step 212); the target infrastructure configuration flag (if any had been created in Step 228); and at least one proxy infrastructure configuration flag (if any had been created in Step 276).

In Step 280, the sizing response (generated in Step 280) is provided to the data management service (see e.g., FIGS. 1A and 1B) in reply to the sizing request (received in Step 200).

Figure 3A:
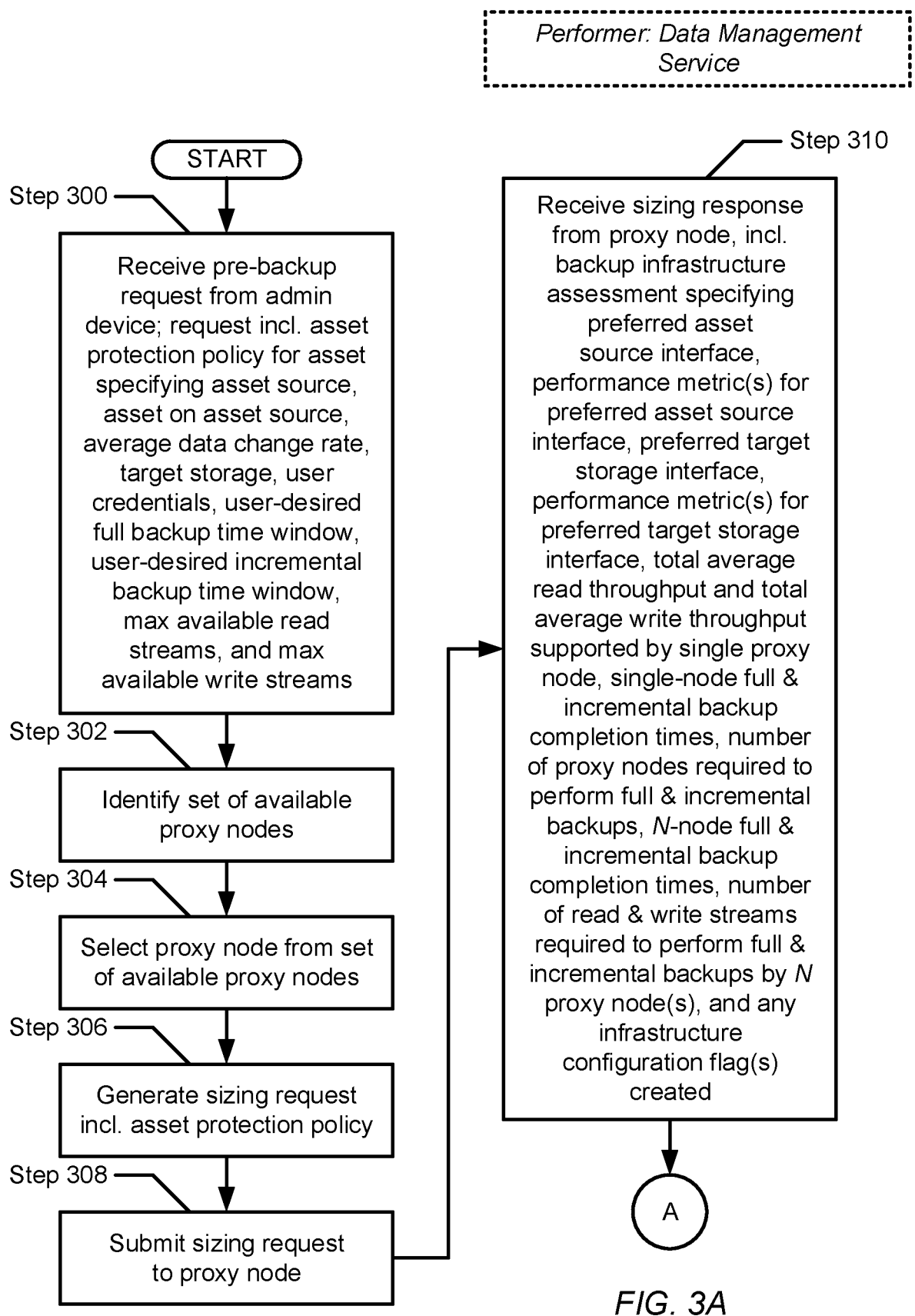
FIGS. 3A and 3B show a flowchart describing a method for processing pre-backup and backup requests in accordance with one or more embodiments described herein.
Figure 3B:
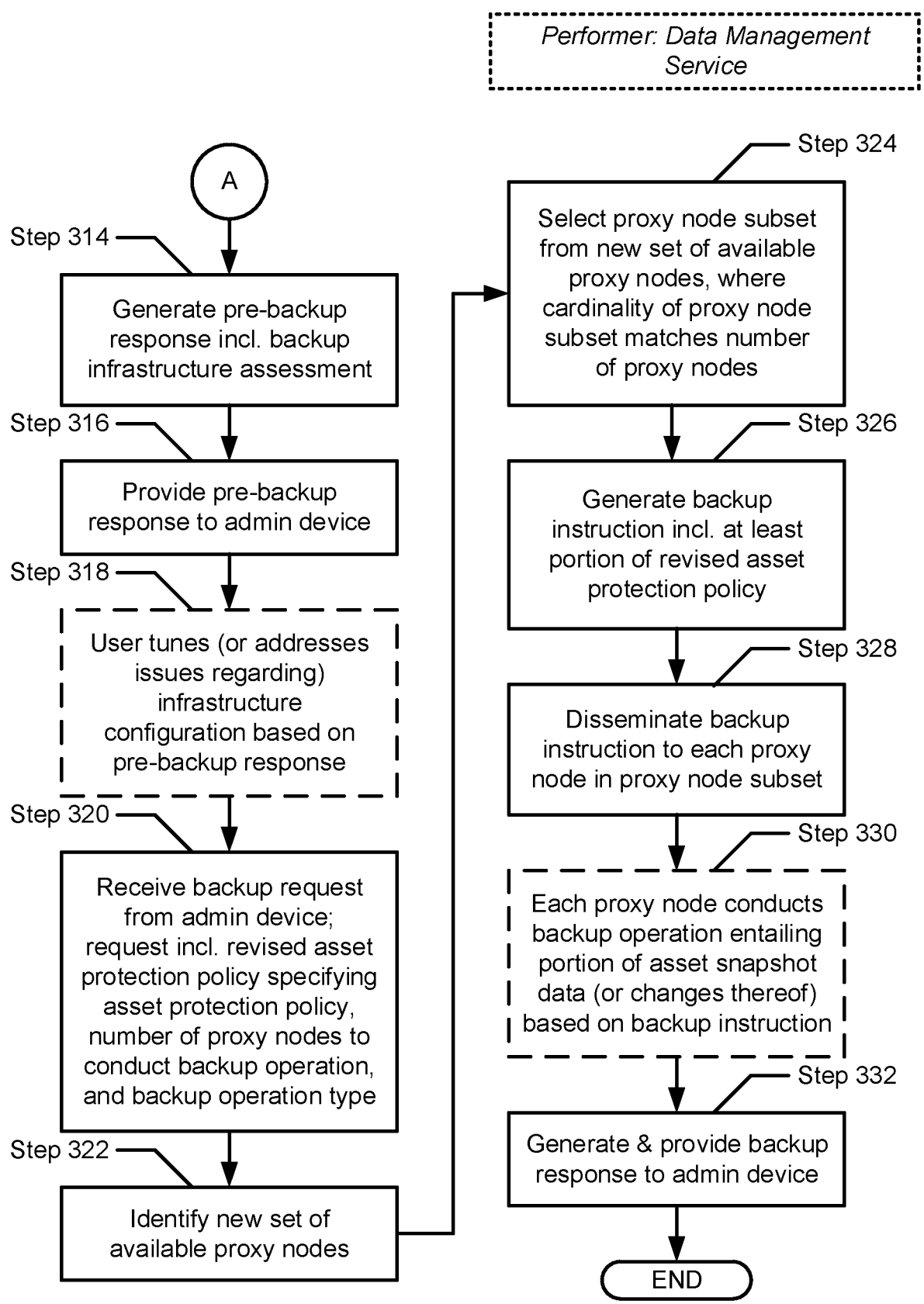

FIGS. 3A and 3B show a flowchart describing a method for processing pre-backup and backup requests in accordance with one or more embodiments described herein. The various steps outlined below may be performed by the data management service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a pre-backup request is received from the admin device (see e.g., FIG. 1A). In one or many embodiment(s) described herein, the pre-backup request may pertain to executing a backup infrastructure assessment capturing the current viability, as well as providing any alert(s) and/or recommendation(s) pertinent to an optimal environment sizing, of the backup infrastructure to conduct any asset protection (i.e., backup and/or recovery) operations entailing an asset and according to an asset protection policy associated therewith. The optimal environment sizing, in turn, may refer to an ideal backup infrastructure configuration (e.g., number of proxy nodes, number of read and/or write streams per proxy node, etc.) sufficing backup and/or recovery requirements and properties specified in the asset protection policy. Further, said backup infrastructure may reference at least a portion of a system (see e.g., FIG. 1A), including any number of proxy nodes (see e.g., FIG. 1C), any number of asset sources (see e.g., FIG. 1D), any number of target storages (see e.g., FIG. 1E), and any network fabric(s) there-between.

In one or many embodiment(s) described herein, the pre-backup request may include or specify an asset protection policy covering (or configured for) an asset. The asset protection policy may encompass a set of rules and procedures outlining a strategy for protecting (e.g., via any number of backup operations) data and/or metadata maintained on the asset (see e.g., FIG. 1D). The set of rules and procedures may, for example, dictate: which asset data and/or metadata maintained on the asset should be protected; on which asset source is the asset hosted or through which asset source is the asset accessible; where (e.g., one or more target storages) should backup copies (e.g., asset data and/or metadata copies (see e.g., FIG. 1E)) of any protected asset data and/or metadata be stored; how often should a backup operation centered about the asset transpire; and how long should any backup copies of any protected asset data and/or metadata be retained. Said set of rules and procedures are not limited to the aforementioned specific examples.

In one or many embodiment(s) described herein, the asset protection policy additionally reflect a list of user-defined requirements and/or properties pertinent to the protection (e.g., via any number of backup operations) of asset data and/or metadata maintained on the asset. The user-defined requirements and/or properties may, for example, include: an average data change rate (expressed as a percentage of storage space consumed by any data) for the asset observed through a specified time period (e.g., one day, one week, etc.); user credentials, belonging to any administrator(s), providing access and protection authority directed to the asset; a user-desired full backup time window reflecting a maximum time period in which a full backup of the asset should complete; a user-desired incremental backup time window reflecting a maximum time period in which an incremental backup of the asset should complete; a maximum number of available read streams that may be allocated towards the reading (or retrieving) of asset data and/or metadata of the asset from the specified asset source (during any backup operations) or from the specified target storage (during any recovery operations); and a maximum number of available write streams that may be allocated towards the writing (or storing) of asset data and/or metadata of the asset to the specified target storage (during any backup operations) or to the specified asset source (during any recovery operations). Said list of user-defined requirements and/or properties are not limited to the aforementioned specific examples.

In Step 302, a set of available proxy nodes, within/across the backup infrastructure, is identified. In one or many embodiment(s) described herein, any available proxy node may refer to a proxy node that is either not currently processing a sizing request (see e.g., FIGS. 2A-2F) or not currently conducting a full (or incremental) backup operation entailing at least a portion of given asset snapshot data (or change(s) respective thereof). That is, any available proxy node may refer to an idle proxy node.

In Step 304, from the set of available proxy nodes (identified in Step 302), a proxy node is selected. In one or many embodiment(s) described herein, selection of the proxy node may employ any existing process for selecting an entity from a group of available entities.

In Step 306, a sizing request is generated. In one or many embodiment(s) described herein, the sizing request may include or specify at least a portion of the asset protection policy (specified via the pre-backup request received in Step 300).

In Step 308, the sizing request (generated in Step 306) is submitted to the proxy node (selected in Step 304).

In Step 310, in reply to the sizing request (submitted in Step 308), a sizing response is received from the proxy node (selected in Step 304). In one or many embodiment(s) described herein, the sizing response may include a backup infrastructure assessment of the backup infrastructure. Said backup infrastructure assessment, further, may include or specify: a preferred asset source interface (see e.g., Step 208 in FIG. 2A); the asset source interface performance metric(s) (see e.g., Step 206 in FIG. 2A) respective to the preferred asset source interface; the preferred target storage interface (see e.g., Step 224 in FIG. 2B); the target storage interface performance metric(s) (see e.g., Step 222 in FIG. 2B) respective to the preferred target storage interface; the total average read throughput (see e.g., Step 246 in FIG. 2C) supported by any single proxy node; the total average write throughput (see e.g., Step 250 in FIG. 2C) supported by any single proxy node; the single-node full backup completion time (see e.g., Step 254 in FIG. 2D); the single-node incremental backup completion time (see e.g., Step 256 in FIG. 2D); the number of proxy nodes (see e.g., Step 258 in FIG. 2D) required to perform any prospective full backup operation entailing the entirety of the asset snapshot data; the number of proxy nodes (see e.g., Step 260 in FIG. 2D) required to perform any prospective incremental backup operation entailing estimated change(s) to the asset snapshot data; the number of read and write streams (see e.g., Step 268 in FIG. 2E) required collectively by the number of proxy nodes (see e.g., Step 258 in FIG. 2D) to support any prospective full backup operation entailing the entirety of the asset snapshot data; the number of read and write streams (see e.g., Step 270 in FIG. 2E) required collectively by the number of proxy nodes (see e.g., Step 260 in FIG. 2D) to support any prospective incremental backup operation entailing estimated change(s) to the asset snapshot data; the source infrastructure configuration flag (if any—see e.g., Step 212 in FIG. 2A); the target infrastructure configuration flag (if any—see e.g., Step 228 in FIG. 2B); and at least one proxy infrastructure configuration flag (if any—see e.g., Step 276 in FIG. 2F).

Hereinafter, the method proceeds to Step 314 (see e.g., FIG. 3B).

Turning to FIG. 3B, in Step 314, a pre-backup response is generated. In one or many embodiment(s) described herein, the pre-backup response may include the backup infrastructure assessment (received via the sizing response in Step 310).

In Step 316, the pre-backup response (generated in Step 314) is provided to the admin device (see e.g., FIG. 1A) in reply to the pre-backup request (received in Step 300).

In Step 318, following receipt of the pre-backup response by/at the admin device, any administrator(s) operating said admin device may review the enclosed backup infrastructure assessment and, following said review, may tune a configuration of the backup infrastructure based on (or to address any issue(s) cited by) the backup infrastructure assessment. Any change(s) to the backup infrastructure configuration may be reflected, at least in part, in a revised asset protection policy assigned to the asset on which the sizing request (submitted in Step 308) had focused. Said change(s), moreover, may incorporate the suggestion(s) or recommendation(s) (e.g., number of proxy nodes to support full (or incremental) backup operations entailing the asset snapshot data of the asset (or alteration(s) thereof), etc.) provided in the backup infrastructure assessment.

In Step 320, a backup request is received from the admin device (see e.g., FIG. 1A). In one or many embodiment(s) described herein, the backup request may pertain to performing a backup operation, of a specified backup operation type (e.g., a full backup or an incremental backup), entailing the asset on which the sizing request (submitted in Step 308) had focused. The backup request, further, may include a revised asset protection policy (described above), which, in turn, may include or specify: the asset protection policy (received via the pre-backup request in Step 300); the number of proxy nodes (received via the sizing response in Step 310) required to perform the sought backup operation of the specified backup operation type; and, of course, the specified backup operation type sought to be conducted.

In Step 322, a new set of available proxy nodes is identified. In one or many embodiment(s) described herein, any new available proxy node may refer to a proxy node that is either not currently processing a sizing request (see e.g., FIGS. 2A-2F) or not currently conducting a full (or incremental) backup operation entailing at least a portion of given asset snapshot data (or change(s) respective thereof). That is, any new available proxy node may refer to an idle proxy node.

In Step 324, from the new set of available proxy nodes (identified in Step 322), a proxy node subset is selected. In one or many embodiment(s) described herein, a cardinality (or number) of proxy nodes of the proxy node subset may match the number of proxy nodes (specified in the backup request received in Step 320). Further, selection of any proxy node of the proxy node subset may employ any existing process for selecting an entity from a group of new available entities.

In Step 326, one or more backup instructions is/are generated. Particularly, in one or many embodiment(s) described herein, a cardinality (or number) of the generated backup instruction(s) that may match a cardinality (or number) of proxy nodes selected into the proxy node subset (in Step 324). Further, any backup instruction, to be assigned to a given selected proxy node, may include at least a portion of the revised asset protection policy (received via the backup request in Step 320). Said at least portion of the revised asset protection policy may reflect information therein necessary for the corresponding selected proxy node to conduct an at least portion of the backup operation, of the specified backup operation type, assigned thereto.

In Step 328, the backup instruction(s) (generated in Step 326) is/are disseminated to each proxy node in the proxy node subset (selected in Step 324).

In Step 330, upon receiving a respective backup instruction (disseminated in Step 328), any proxy node in the proxy node subset (selected in Step 324) may proceed to conduct their respective at least portion of the backup operation of the backup operation type (specified in the backup request received in Step 320) and entailing their respective at least portion of any asset snapshot data (or change(s) thereof) of the asset. Moreover, depending on a result experienced by any proxy node, said any proxy node may generate and submit an instruction response in reply to their respective backup instruction. Any instruction response may cite the completion (or incompletion) of a respective at least portion of the backup operation of the backup operation type conducted by a corresponding proxy node thereof.

In Step 332, a backup response is generated. In one or many embodiment(s) described herein, the backup response may include an overall completion (or incompletion) message indicating whether the backup operation, of the backup operation type specified in the backup request received in Step 320), had been successful (or unsuccessful). For example, an overall completion or success of the backup operation may occur when each/all instruction response(s), returned by the proxy node(s) of the proxy node subset (selected in Step 324), reflect(s) a completion or successful indicator. Alternatively, by way of another example, an overall incompletion or failure of the backup operation may occur when at least one instruction response, returned respectively by at least one proxy node of the proxy node subset, reflect(s) an incompletion or unsuccessful indicator. Thereafter, the generated backup response is provided (or transmitted) to the admin device in reply to the backup request (received therefrom in Step 320).

Figure 4:
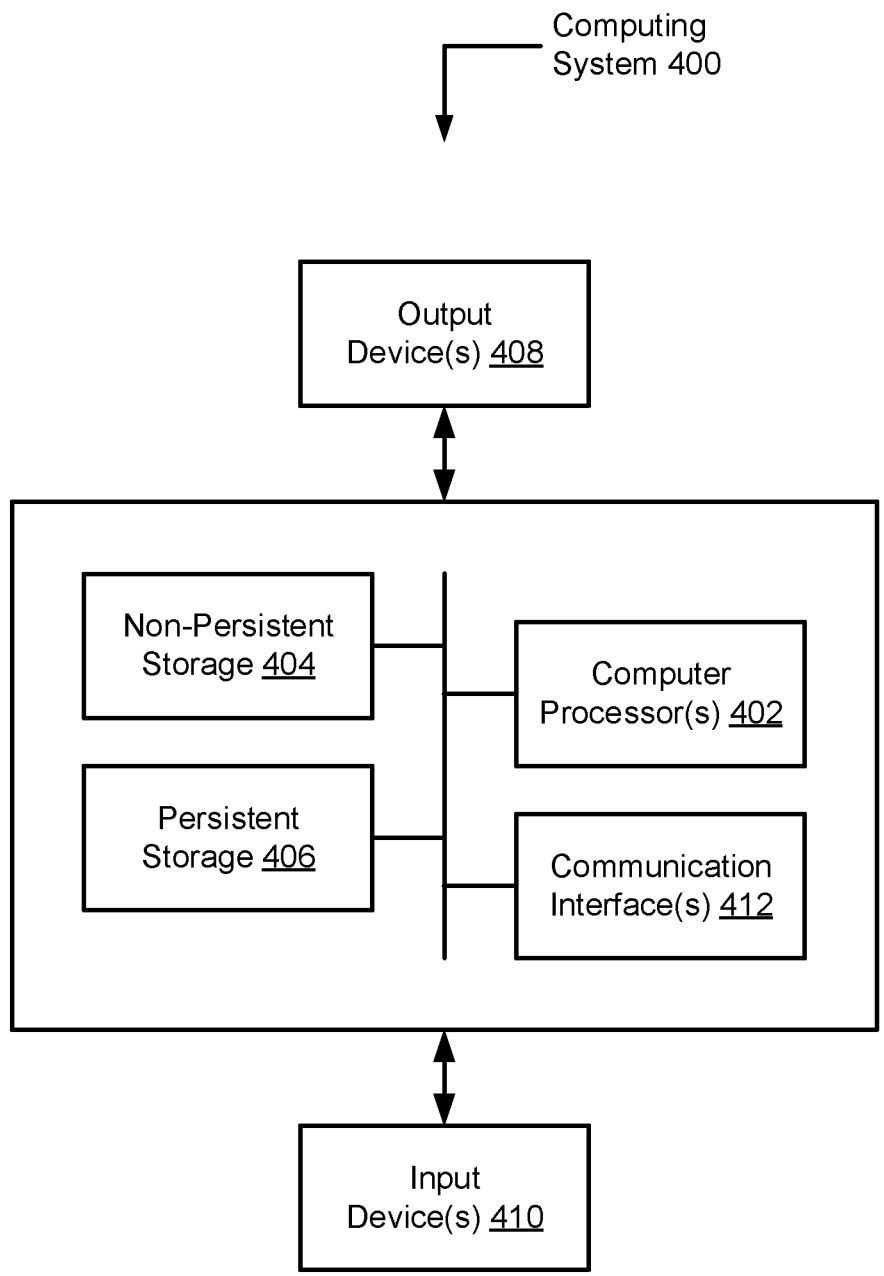
FIG. 4 shows an exemplary computing system in accordance with one or more embodiments described herein.

FIG. 4 shows an exemplary computing system in accordance with one or more embodiments described herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or many embodiment(s) described herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one or many embodiment(s) described herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for sizing backup infrastructure, the method comprising:
   receiving a sizing request comprising an asset protection policy covering an asset of the backup infrastructure, the asset protection policy at least specifying the asset;
   based on receiving the sizing request:
      creating an asset snapshot of the asset;
      mounting the asset snapshot to obtain a mounted asset snapshot through which asset snapshot data of the asset snapshot is accessible;
      partitioning the asset snapshot data into a plurality of asset snapshot data slices;
      computing, at least based on a cardinality of the plurality of asset snapshot data slices, a number of proxy nodes of the backup infrastructure required to collectively perform a prospective backup operation entailing the asset snapshot data; and
      providing, in reply to the sizing request, a sizing response at least specifying the number of proxy nodes required to collectively perform the prospective backup operation.

2. The method of claim 1, wherein the prospective backup operation is to be one selected from a group of backup operations comprising a full backup operation and an incremental backup operation.

3. The method of claim 2, wherein the asset protection policy further specifies one selected from a group of user-desired backup time windows restricting completion of the prospective backup operation to a user-specified time period and comprising a user-desired full backup time window if the one selected from the group of backup operations is the full backup operation, and a user-desired incremental backup time window if the one selected from the group of backup operations is the incremental backup operation.

4. The method of claim 3, wherein computation of the number of proxy nodes is further based on the one selected from the group of user-desired backup time windows and one selected from a group of single-node backup completion times reflecting an estimated time period through which a single proxy node completes the prospective backup operation and comprising a single-node full backup completion time if the one selected from the group of backup operations is the full backup operation, and a single-node incremental backup completion time if the one selected from the group of backup operations is the incremental backup operation.

5. The method of claim 4, wherein the sizing response further specifies the one selected from the group of single-node backup completion times based on the one selected from the group of backup operations.

6. The method of claim 4, wherein the asset protection policy further specifies an asset source of the backup infrastructure comprising the asset and a target storage of the backup infrastructure configured to store backup copies of the asset snapshot data, and wherein computation of the one selected from the group of single-node backup completion times is based on an asset snapshot data size measuring storage space on the asset source consumed by the asset snapshot data, a total average read throughput measuring an average read rate through which the asset snapshot data is to be retrieved from the asset source, and a total average write throughput measuring an average write rate through which the asset snapshot data is to be stored on the target storage.

7. The method of claim 6, wherein computation of the single-node incremental backup completion time is further based on an average data change rate through which the asset snapshot data is to experience data changes over a time period, and wherein the asset protection policy further specifies the average data change rate.

8. The method of claim 6, wherein the sizing response further specifies the total average read throughput and the total average write throughput.

9. The method of claim 6, wherein computation of the total average read throughput is based on first benchmark assessments capturing file read performances involving a plurality of file size categories represented across a file size histogram of the asset snapshot data, and wherein computation of the total average write throughput is based on second benchmark assessments capturing file write performances involving the plurality of file size categories represented across the file size histogram of the asset snapshot data.

10. The method of claim 9, wherein computation of the total average read throughput is further based on a maximum number of parallel read streams supported by the single proxy node, and wherein computation of the total average write throughput is further based on a maximum number of parallel write streams supported by the single proxy node.

11. The method of claim 10, the method further comprising:
prior to providing the sizing response and based on the number of proxy nodes required to collectively perform the prospective backup operation:
computing a number of read streams required to collectively perform the prospective backup operation further based on the maximum number of parallel read streams supported by the single proxy node; and
computing a number of write streams required to collectively perform the prospective backup operation further based on the maximum number of parallel write streams supported by the single proxy node.

12. The method of claim 11, wherein the sizing response further specifies the number of read streams, and the number of write streams, required to collectively perform the prospective backup operation.

13. The method of claim 11, the method further comprising:
making a determination that at least one condition of a group of conditions is met,
the group of conditions comprising:
the number of read streams required to collectively perform the prospective backup operation exceeds a maximum number of available read streams; and
the number of write streams required to collectively perform the prospective backup operation exceeds a maximum number of available write streams; and
based on the determination:
creating at least one proxy infrastructure configuration flag respectively reflecting the at least one condition of the group of conditions that has been met.

14. The method of claim 13, wherein the asset protection policy further specifies the maximum number of available read streams and the maximum number of available write streams, and wherein the sizing response further specifies the at least one proxy infrastructure configuration flag.

15. The method of claim 6, the method further comprising:
prior to creating the asset snapshot of the asset:
discovering a plurality of target storage interfaces of the target storage;
collecting a plurality of target storage interface performance metrics comprising a target storage interface performance metric for each target storage interface in the plurality of target storage interfaces; and
identifying, from the plurality of target storage interfaces, a preferred target storage interface based on the plurality of target storage interface performance metrics,
wherein the sizing response further specifies the preferred target storage interface and the target storage interface performance metric for the preferred target storage interface.

16. The method of claim 15, the method further comprising:
after identifying the preferred target storage interface:
making a determination that the target storage interface performance metric for the preferred target storage interface falls below a performance metric threshold; and
based on the determination:
creating a target infrastructure configuration flag reflecting the determination,
wherein the sizing response further specifies the target infrastructure configuration flag.

17. The method of claim 6, the method further comprising:
prior to creating the asset snapshot of the asset:
discovering a plurality of asset source interfaces of the asset source;
collecting a plurality of asset source interface performance metrics comprising an asset source interface performance metric for each asset source interface in the plurality of asset source interfaces; and identifying, from the plurality of asset source interfaces, a preferred asset source interface based on the plurality of asset source interface performance metrics, wherein the sizing response further specifies the preferred asset source interface and the asset source interface performance metric for the preferred asset source interface.

18. The method of claim 17, the method further comprising:

after identifying the preferred asset source interface:

making a determination that the asset source interface performance metric for the preferred asset source interface falls below a performance metric threshold; and based on the determination:

creating a source infrastructure configuration flag reflecting the determination, wherein the sizing response further specifies the source infrastructure configuration flag.

19. A non-transitory computer readable medium (CRM) comprising computer readable program code, which when executed by a computer processor, enables the computer processor to perform a method for sizing backup infrastructure, the method comprising:

receiving a sizing request comprising an asset protection policy covering an asset of the backup infrastructure, the asset protection policy at least specifying the asset;

based on receiving the sizing request:

creating an asset snapshot of the asset;

mounting the asset snapshot to obtain a mounted asset snapshot through which asset snapshot data of the asset snapshot is accessible;

partitioning the asset snapshot data into a plurality of asset snapshot data slices;

computing, at least based on a cardinality of the plurality of asset snapshot data slices, a number of proxy nodes of the backup infrastructure required to collectively perform a prospective backup operation entailing the asset snapshot data; and providing, in reply to the sizing request, a sizing response at least specifying the number of proxy nodes required to collectively perform the prospective backup operation.

20. A backup infrastructure, comprising:

an asset; and a proxy node operatively connected to the asset and comprising a computer processor at least configured to perform a method for sizing the backup infrastructure, the method comprising:

receiving a sizing request comprising an asset protection policy covering the asset, the asset protection policy at least specifying the asset;

based on receiving the sizing request:

creating an asset snapshot of the asset;

mounting the asset snapshot to obtain a mounted asset snapshot through which asset snapshot data of the asset snapshot is accessible;

partitioning the asset snapshot data into a plurality of asset snapshot data slices;

computing, at least based on a cardinality of the plurality of asset snapshot data slices, a number of proxy nodes required to collectively perform a prospective backup operation entailing the asset snapshot data; and providing, in reply to the sizing request, a sizing response at least specifying the number of proxy nodes required to collectively perform the prospective backup operation.

* * * * *